(12) United States Patent
Bogue et al.

(10) Patent No.: US 10,391,693 B2
(45) Date of Patent: Aug. 27, 2019

(54) DISTRIBUTION OF DRIVING PRESSURE ABOUT A FILAMENT'S CIRCUMFERENCE IN AN EXTRUSION DEVICE

(71) Applicant: WobbleWorks, Inc., Wilmington, DE (US)

(72) Inventors: Maxwell Bogue, Hong Kong (HK); Thomas Walker, Shenzhen (CN)

(73) Assignee: WobbleWorks, Inc., Wilmington, DE (US)

( * ) Notice: Subject to any disclaimer, the term of this patent is extended or adjusted under 35 U.S.C. 154(b) by 427 days.

(21) Appl. No.: 15/167,722

(22) Filed: May 27, 2016

(65) Prior Publication Data

US 2016/0303789 A1 Oct. 20, 2016

Related U.S. Application Data

(63) Continuation of application No. PCT/CN2015/076912, filed on Apr. 17, 2015.

(51) Int. Cl.
*B29C 47/08* (2006.01)
*B29C 67/00* (2017.01)
(Continued)

(52) U.S. Cl.
CPC .......... *B29C 48/2526* (2019.02); *B29C 48/02* (2019.02); *B29C 48/05* (2019.02);
(Continued)

(58) Field of Classification Search
CPC . B29C 41/0813; B29C 47/862; B29C 47/864; B29C 47/92; B29C 47/0002;
(Continued)

(56) References Cited

U.S. PATENT DOCUMENTS 3,281,576 A  10/1966  Cooper
3,559,241 A   2/1971  Chu
(Continued)

FOREIGN PATENT DOCUMENTS

CN  1285856 A  2/2001
CN  2761402 Y  3/2006
(Continued)

OTHER PUBLICATIONS

Techspan Group, "A range of Leister hand-held and automatic welders from Techspan," dated Dec. 12, 2006, retrieved from http://www.ferret.com.au/c/techspan-group/a-range-of-Leister-hand-held-automatic-welders-from-Techspan-n667443.
(Continued)

*Primary Examiner* — Joseph S Del Sole
*Assistant Examiner* — Emmanuel S Luk
(74) *Attorney, Agent, or Firm* — Nathan S. Smith; Danny Mansour; Morgan, Lewis & Bockius LLP

(57) ABSTRACT

An extrusion device can include a driver operatively coupled with a motor such that the driver is rotated about an axis by operation of the motor. The driver can have a passage positioned such that the axis extends through the passage. The driver can have a filament-engaging member positioned in the passage and configured to engage a filament extending through the passage such that rotation of the driver moves the filament relative to the driver. The driver can be positioned such that a first direction of rotation of the driver urges the filament along the axis toward an outlet. A heater can be configured to melt the filament and can be disposed between the driver and the outlet to receive the filament from the driver.

20 Claims, 20 Drawing Sheets

(51) Int. Cl.

| | | |
|---|---|---|
| *B29C 47/92* | (2006.01) | |
| *B29C 47/00* | (2006.01) | |
| *B29C 47/80* | (2006.01) | |
| *B29C 48/25* | (2019.01) | |
| *B29C 48/05* | (2019.01) | |
| *B29C 48/92* | (2019.01) | |
| *B29C 48/80* | (2019.01) | |
| *B33Y 30/00* | (2015.01) | |
| *B29C 64/20* | (2017.01) | |
| *B29C 48/02* | (2019.01) | |
| *B29C 48/285* | (2019.01) | |
| *B29C 64/106* | (2017.01) | |

(52) U.S. Cl.
CPC ...... *B29C 48/2528* (2019.02); *B29C 48/2567* (2019.02); *B29C 48/2886* (2019.02); *B29C 48/802* (2019.02); *B29C 48/92* (2019.02); *B29C 64/20* (2017.08); *B33Y 30/00* (2014.12); *B29C 64/106* (2017.08)

(58) Field of Classification Search
CPC ...... B29C 47/0813; B29C 2947/92076; B29C 2947/9258; B29C 294/926; B29C 64/386; B29C 64/106; B29C 67/0055; B29C 48/2567; B29C 48/2528; B29C 48/02; B29C 48/2886; B29C 48/2526; B29C 64/20; B29C 64/25
See application file for complete search history.

(56) References Cited

U.S. PATENT DOCUMENTS

| | | | |
|---|---|---|---|
| 3,604,597 A | 9/1971 | Pohl et al. | |
| 3,665,158 A | 5/1972 | Froedge | |
| 3,887,319 A | 6/1975 | Cottingham | |
| 4,059,204 A | 11/1977 | Duncan et al. | |
| 4,552,287 A | 11/1985 | Dziki | |
| 4,597,821 A | 7/1986 | Munro | |
| 4,681,524 A | 7/1987 | Ikeda et al. | |
| 5,121,329 A | 6/1992 | Crump | |
| 5,169,587 A | 12/1992 | Courval | |
| 5,340,433 A | 8/1994 | Crump | |
| 5,843,490 A | 12/1998 | Horiba et al. | |
| 5,853,774 A | 12/1998 | Dreve | |
| 6,129,872 A | 10/2000 | Jang | |
| 6,162,378 A | 12/2000 | Bedal et al. | |
| 6,238,613 B1 | 5/2001 | Batchelder et al. | |
| 6,460,481 B1 | 10/2002 | Young | |
| 6,500,374 B1 | 12/2002 | Akioka et al. | |
| 6,558,059 B1 | 5/2003 | Hillinger et al. | |
| 6,776,602 B2 | 8/2004 | Swanson et al. | |
| 8,221,669 B2 | 7/2012 | Batchelder et al. | |
| 8,236,227 B2 | 8/2012 | Batchelder et al. | |
| 8,262,304 B2 | 9/2012 | Llach et al. | |
| 8,439,665 B2 | 5/2013 | Batchelder et al. | |
| 8,926,882 B2 | 1/2015 | Batchelder et al. | |
| 9,067,458 B1 | 6/2015 | Mock | |
| 9,102,098 B2 | 8/2015 | Dilworth et al. | |
| 9,912,001 B2* | 3/2018 | Perez .................... B65H 51/00 | |
| 2001/0030383 A1 | 10/2001 | Swanson et al. | |
| 2001/0033037 A1 | 10/2001 | Nitschke et al. | |
| 2003/0137077 A1 | 7/2003 | Lee et al. | |
| 2004/0232165 A1 | 11/2004 | Lee | |
| 2005/0129941 A1 | 6/2005 | Comb et al. | |
| 2005/0288813 A1 | 12/2005 | Yang et al. | |
| 2006/0051442 A1 | 3/2006 | Miceli et al. | |
| 2007/0003656 A1 | 1/2007 | LaBossiere et al. | |
| 2007/0029693 A1 | 2/2007 | Wigand et al. | |
| 2007/0037650 A1* | 2/2007 | Wessely ................ H02K 7/116 475/5 |
| 2007/0228590 A1 | 10/2007 | LaBossiere et al. | |
| 2008/0197116 A1 | 8/2008 | Achtner et al. | |
| 2008/0213419 A1 | 9/2008 | Skubic et al. | |
| 2009/0274540 A1 | 11/2009 | Batchelder et al. | |
| 2009/0283544 A1 | 11/2009 | Salmela et al. | |
| 2010/0147465 A1 | 6/2010 | Di Miceli et al. | |
| 2010/0166969 A1 | 7/2010 | Batchelder | |
| 2010/0327479 A1 | 12/2010 | Zinniel et al. | |
| 2011/0074065 A1 | 3/2011 | Batchelder et al. | |
| 2011/0076495 A1* | 3/2011 | Batchelder .......... B29C 47/0038 428/369 |
| 2011/0076496 A1 | 3/2011 | Batchelder et al. | |
| 2011/0079936 A1 | 4/2011 | Oxman | |
| 2011/0196660 A1 | 8/2011 | Liu et al. | |
| 2012/0070523 A1 | 3/2012 | Swanson et al. | |
| 2012/0219699 A1 | 8/2012 | Pettersson et al. | |
| 2012/0258190 A1 | 10/2012 | Batchelder et al. | |
| 2013/0209600 A1 | 8/2013 | Tow | |
| 2013/0234366 A1 | 9/2013 | Batchelder et al. | |
| 2014/0044823 A1 | 2/2014 | Pax et al. | |
| 2014/0120197 A1 | 5/2014 | Swanson et al. | |
| 2014/0154347 A1 | 6/2014 | Dilworth et al. | |
| 2014/0159273 A1 | 6/2014 | Koop et al. | |
| 2014/0291886 A1 | 10/2014 | Mark et al. | |
| 2014/0328963 A1 | 11/2014 | Mark et al. | |
| 2015/0096717 A1 | 4/2015 | Batchelder et al. | |
| 2015/0137402 A1 | 5/2015 | Schmehl et al. | |
| 2015/0147427 A1 | 5/2015 | Lundwall et al. | |
| 2015/0165691 A1 | 6/2015 | Mark et al. | |
| 2015/0331412 A1 | 11/2015 | Adair et al. | |
| 2016/0031141 A1 | 2/2016 | Dilworth et al. | |
| 2016/0031159 A1 | 2/2016 | Church et al. | |
| 2016/0185028 A1 | 6/2016 | Bogue et al. | |
| 2017/0057168 A1 | 3/2017 | Miller et al. | |
| 2017/0120519 A1 | 5/2017 | Mark | |
| 2017/0157826 A1 | 6/2017 | Hishiki | |

FOREIGN PATENT DOCUMENTS

| | | |
|---|---|---|
| CN | 2813176 Y | 9/2006 |
| CN | 101166597 A | 4/2008 |
| CN | 101172428 A | 5/2008 |
| CN | 201086388 Y | 7/2008 |
| CN | 202079738 U | 12/2011 |
| CN | 202399493 U | 8/2012 |
| CN | 102922721 A | 2/2013 |
| CN | 103341975 A | 10/2013 |
| CN | 203357906 U | 12/2013 |
| CN | 302680797 S | 12/2013 |
| CN | 203371791 U | 1/2014 |
| CN | 203449607 U | 2/2014 |
| CN | 103707511 A | 4/2014 |
| CN | 302781312 S | 4/2014 |
| CN | 203592687 U | 5/2014 |
| CN | 203752533 U | 8/2014 |
| CN | 203752534 U | 8/2014 |
| CN | 104040040 A | 9/2014 |
| DE | 3341201 A1 | 5/1985 |
| EM | 002315440-0001 | 9/2013 |
| EM | 002315440-0002 | 9/2013 |
| EP | 0257838 A2 | 3/1988 |
| EP | 2957420 A1 | 12/2015 |
| JP | S 61-141959 A | 6/1986 |
| JP | S63-205216 A | 8/1988 |
| WO | WO-99/32544 A1 | 7/1999 |
| WO | WO-2009/134298 A2 | 11/2009 |
| WO | WO-2012/088257 A1 | 6/2012 |
| WO | WO-2012/152510 A1 | 11/2012 |
| WO | WO-2012/152511 A1 | 11/2012 |
| WO | WO-2014/088681 A1 | 6/2014 |
| WO | WO-2015/020944 A1 | 2/2015 |
| WO | WO-2015/193490 A2 | 12/2015 |
| WO | WO-2016/108950 A1 | 7/2016 |

OTHER PUBLICATIONS

Donutman.sub.-2000 "Plastic Welding Gun (Plastruder MK4)" published Sep. 19, 2010, retrieved from http://www.thingiverse.com/thing:4156.

MonUnivers3D: 3Ddoodler, a 3D drawing pen, dated Aug. 9, 2013, retrieved from http://www.monunivers3d.com/1493.

(56) References Cited

OTHER PUBLICATIONS

Heater, "SwissPen 3D printing pen brings 3Doodler competition well before launch," dated Aug. 21, 2103, retrieved from www.engadget.com/2013/08/21/swisspen/.
Fincher, "Move over 3Doodler—here comes the SwissPen," dated Aug. 23, 2013, retrieved from http://newatlas.com/swisspen-handheld-3d-printer/28799/.
Bryant, "Adobe moves into hardware: Project Mighty 'cloud pen' and Project Napoleon ruler to launch in 2014," dated Sep. 17, 2013, retrieved from wwe.thenextweb.com/gadgets/2013/09/17/adobe-moves-into-hardware-its-project-mighty-cloud-pen-and-project-napoleon-digital-ruler-will-launch-in-2014- /.
"3DSIMO: The Amazing 3D Pen," dated Sep. 25, 2013, retrieved from www.popular3dprinters.com/3dsimo-the-amazing-3d-pen/.
"3D MakerPen—Handheld 3D Printer," Web page retrieved Sep. 27, 2013 from MakerGeeks.com, 2 pages.
"3Dsimo: First multi-material 3D drawing pen," dated Oct. 15, 2013, retrieved from www.3ders.org/articles/20131015-3dsimo-first-multi-material-3d-drawing-pe- n.html.
So, "Adobe's first hardware in the form of a 'cloud pen' and digital ruler," dated Nov. 1, 2013, retrieved from www.itbusiness.ca/news/adobes-first-hardware-comes-in-the-form-of-a-cloud--pen-and-digital-ruler/44527.
Indiegogo campaign Web page, "3Dsimo—The Next Generation of 3D pens," (stating "campaign ended on Mar. 1, 2014"), retrieved on Apr. 15, 2015 from www.indiegogo.com/projects/3dsimo-the-next-generation-of-3d-pens--4.
"New OEM Model Leak!" Yaya Technology, dated Jan. 16, 2014, retrieved from www.yaya3dpen.com/?p=2939.
Webpage, RainSun 3D Pen dated Feb. 14, 2014, retrieved from www.abs-production.ru/articles/115123.
"Crowdsourcing Mornings: 3Dsimo—The Next Generation of 3D Pens," dated Feb. 24, 2014, retrieved from www.geekalabama.com/2014/02/24/crowdsourcing-mornings-3dsimo-the-next-gen-eration-of-3d-pens/.
"Lixpen, the smallest 3D printing pen," dated Mar. 28, 2014, retrieved from www.3ders.org/articles/20140328-lixpen-the-smallest-3d-printing-pen.html.
Webpage including image of Ahiro-002A, dated Apr. 4, 2014, retrieved from http://fm.homelan.lg.ua/?p=20675.
"Myriwell 3D Printing Pen Lets You Create 3D Models with Your Hand," dated May 19, 2014, retrieved from gadgetsin.com/myriwell-3d-printing-pen-lets-you-create-3d-models-with-you- r-hand.htm.
Ridden, "Cordless CreoPop pen makes 3D sketching cool," dated Jun. 5, 2014, retrieved from www.gizmag.com/creopop-3d-sketch-pen/32422/.
"CreoPop-Cool Ink. Infinite Creativity," Web page retrieved on Apr. 15, 2015 from www.indiegogo.com/projects/creopop-cool-ink-infinite-creativity.
"iMakr 3D Printing Pen Review", dated Jul. 28, 2014, retrieved from http://3dprinterplans.info/imakr-3d-printing-pen-review/.
"Polyes Q1 SLA-based 3D Printing Pen to Launch on Kickstarter in November," dated Sep. 30, 2014, retrieved from www.3dprint.com/17201/polyes-q1-3d-printing-pen/.
"RP400A 3D pen with OLED display," JER Education Technology Co Ltd, retrieved Sep. 20, 2016 from http://www.jereducation.com/yw/cpzx_show.asp?pid=266.
"Polyes Q1—The Safest, Cool-Ink 3D Pen," (stating Funding Period Dec. 21, 2014 to Feb. 4, 2015), retrieved from www.kickstarter.com/projects/1241980839/polyes-q1-the-safest-cool-ink-3d-pen/description.
"3D Pen OEM Version," Yaya Technology, Web page retrieved on Apr. 15, 2015 from www.yaya3dpen.com/?page.sub.--id=3015.
Ahiro-002A Product description retrieved on Jun. 12, 2015 from http://www.goodluckbuy.com/images/detailed.sub.--images2/file/Printer%20P- en.pdf.
"3D pen RP500A 3D pen with LCD screen," JER Education Technology Co Ltd, retrieved Sep. 20, 2016 from http://www.jereducation.com/yw/cpzx_show.asp?pid=268.
CoLiDo, "CoLiDo 3D Pen: Maximize Safety in 3D Printing Pen," (stating Funding Period Feb. 8, 2016 to Mar. 9, 2016), retrieved from https://www.kickstarter.com/projects/colido/colido-3d-pen-maximize-safety-in-3d-printing-pen.
Shenzhen YAYA Technology Co Ltd, "YAYA 3D Printing Pen V2," retrieved Sep. 20, 2016 from http://www.yaya3dpen.com/?page_id=3425.
Extended European Search Report from European Patent Application No. 15851624.5, dated Oct. 17, 2017, 9 pages.
"Handheld Product Ergonomic Design," Human Engineering, Jun. 2011, vol. 17, No. 2, pp. 186-189.

\* cited by examiner

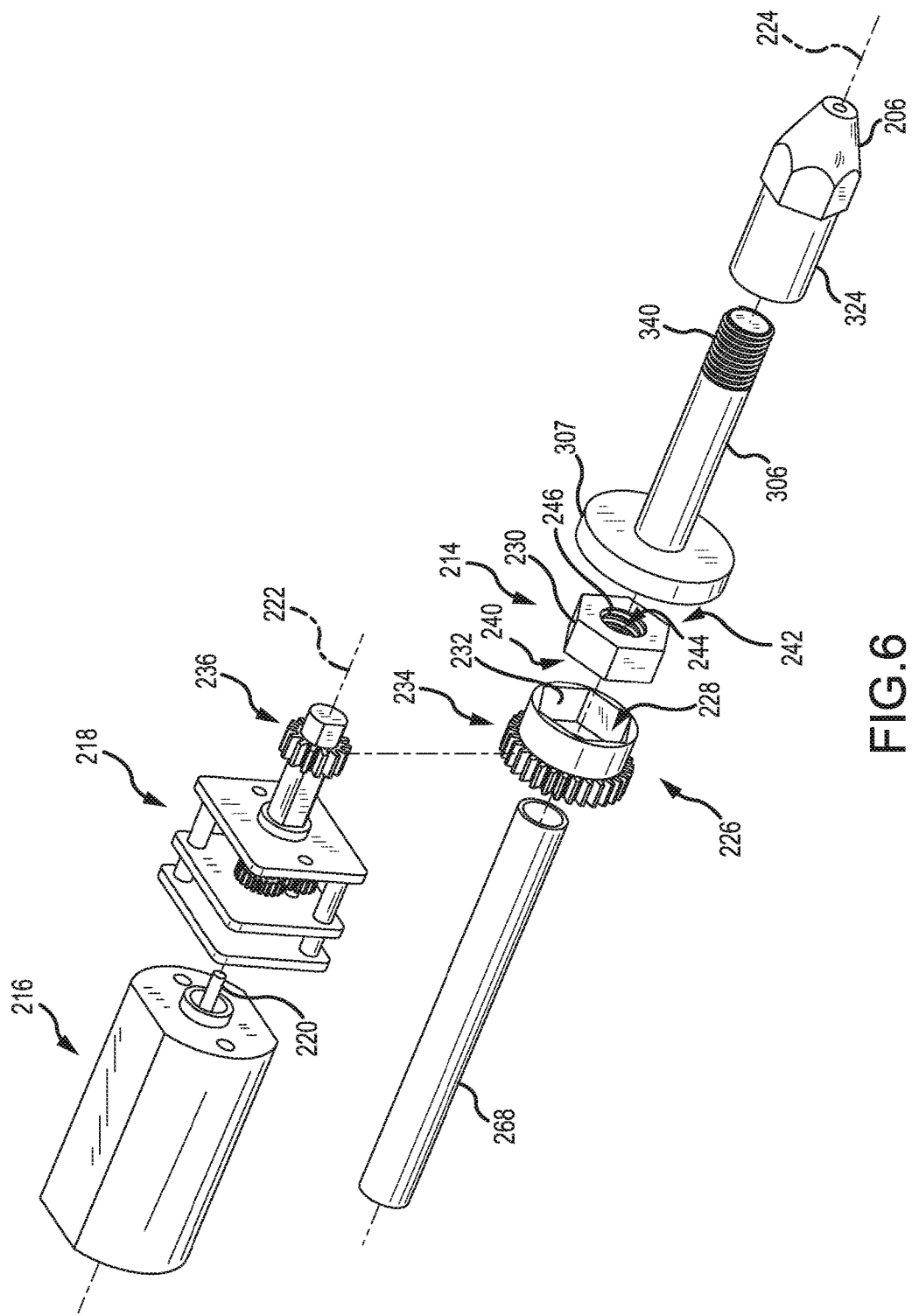

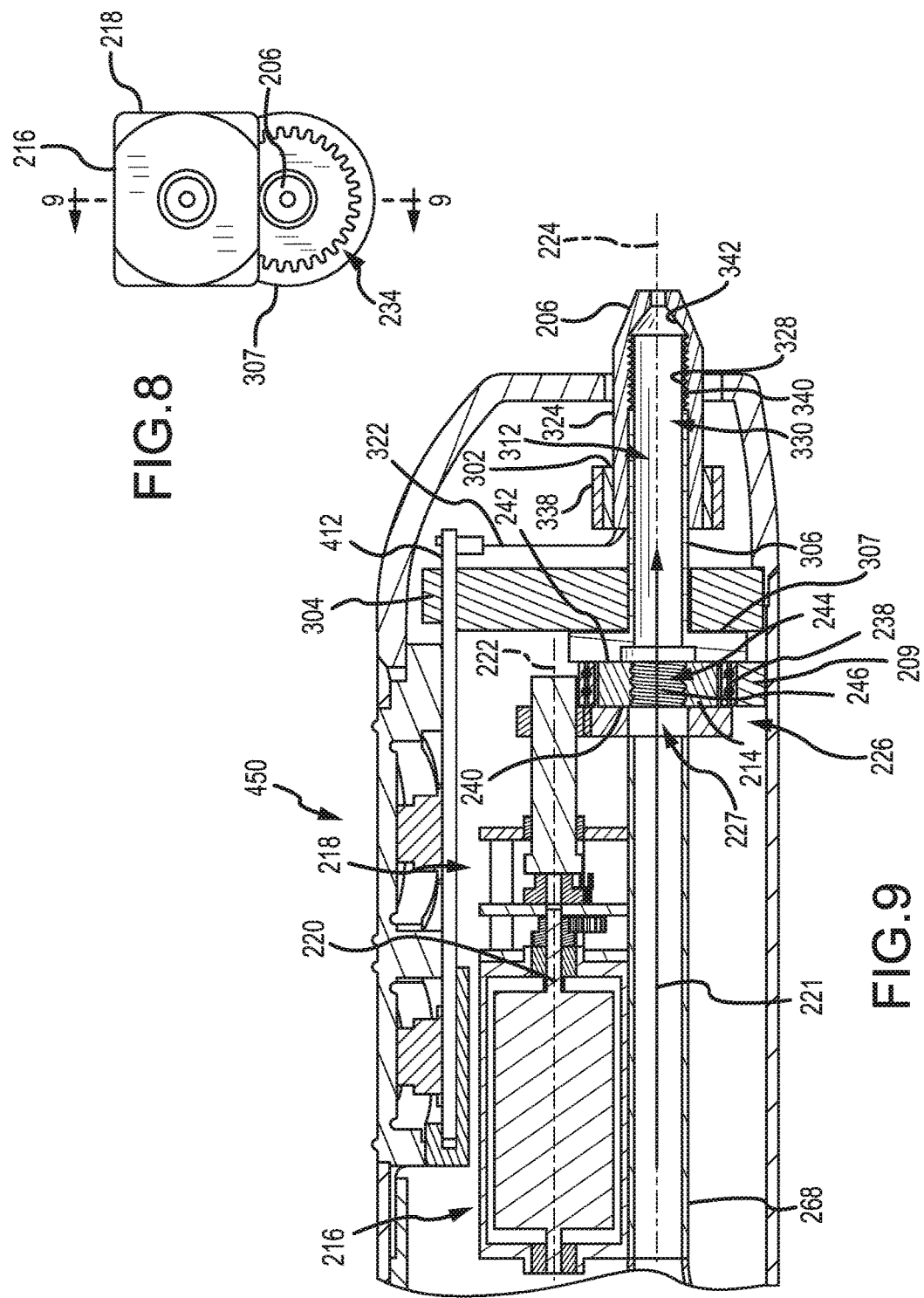

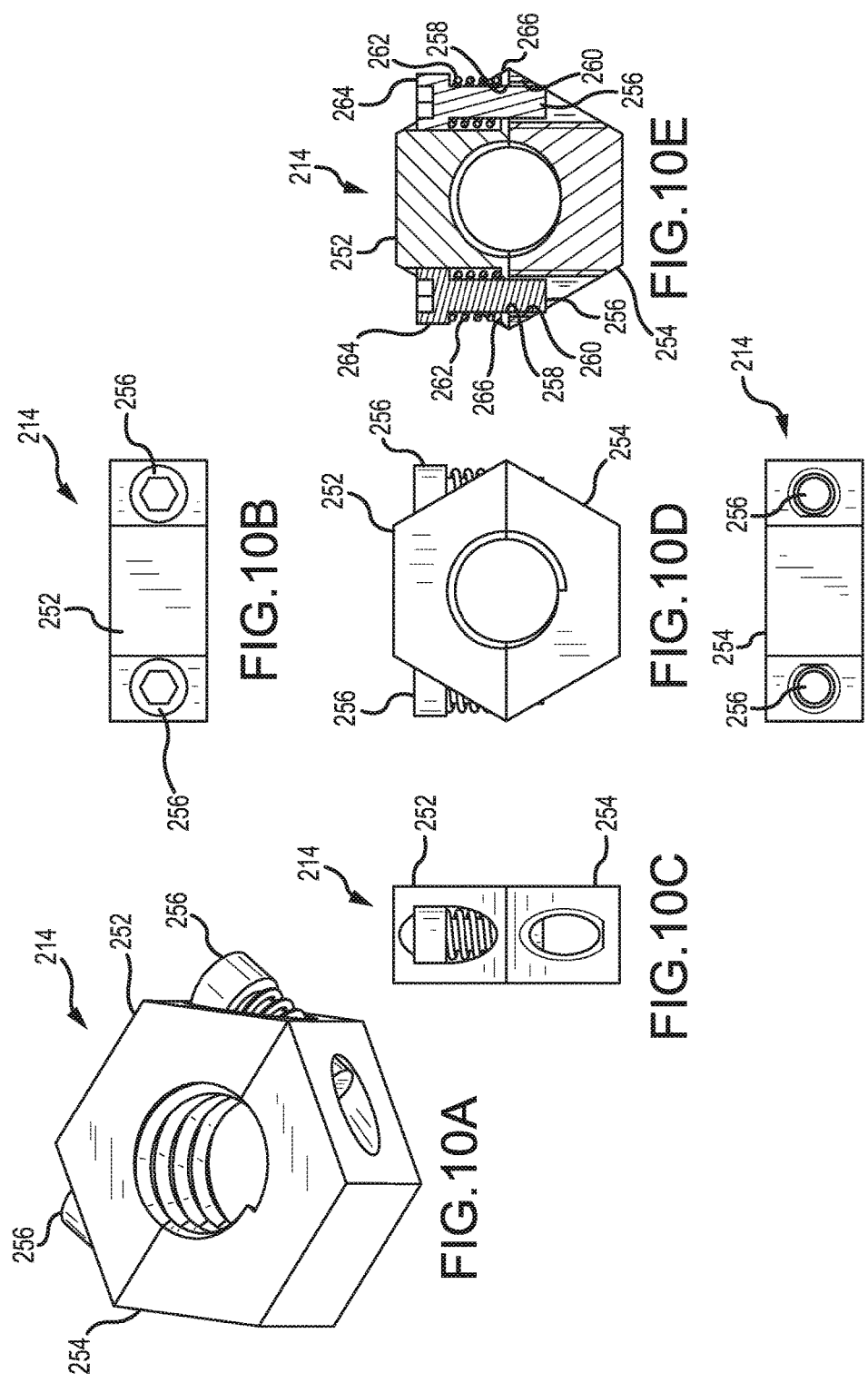

DISTRIBUTION OF DRIVING PRESSURE ABOUT A FILAMENT'S CIRCUMFERENCE IN AN EXTRUSION DEVICE

CROSS-REFERENCE TO RELATED APPLICATION

This application is a continuation of International Patent Application No. PCT/CN2015/076912, filed Apr. 17, 2015, the entirety of which is incorporated by reference herein.

BACKGROUND

The present disclosure relates generally to extrusion devices and more particularly, in some aspects, to extrusion devices for three-dimensional drawing.

Three-dimensional ("3D") printers can be used to produce 3D items using extruded material. These printers tend to be large, expensive, and their operation requires a computer file, for example as generated by a Computer-Aided Design (CAD) program, which determines the item created. Handheld devices also can be used to create 3D items of extruded material.

SUMMARY

An aspect of some implementations of the subject technology involves improved application of driving pressure to a filament fed into an extrusion device by distributing driving pressure about a circumference of the filament. Such distribution of driving pressure can, in some embodiments, (i) permit elimination of a component applying pressure against the filament to urge the filament against a filament driver of the extrusion device, (ii) increase an amount of driving pressure that can be applied to the filament, (iii) improve control of filament movement relative to the extrusion device, (iv) allow use of filament materials having a wider range of hardness, toughness, and strength with the same filament driver, or (v) a combination of some or all of (i)-(iv).

The subject technology is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses may be combined in any combination, and placed into a respective independent clause, e.g., clause 1, 24, or 47. The other clauses can be presented in a similar manner.

Clause 1. An extrusion device comprising:
an outlet;
a motor;
a driver operatively coupled with the motor such that the driver is rotated about an axis by operation of the motor, the driver having a passage extending through the driver along the axis, the axis extending through the passage, the driver comprising a filament-engaging member positioned in the passage and configured to engage a filament extending through the passage such that rotation of the driver moves the filament relative to the driver, the driver positioned such that a first direction of rotation of the driver urges the filament along the axis toward the outlet;
a heater configured to melt the filament and disposed between the driver and the outlet to receive the filament from the driver.

Clause 2. The extrusion device of Clause 1, wherein the filament-engaging member protrudes into the passage.

Clause 3. The extrusion device of Clause 1, wherein the filament-engaging member engages the filament along a helical path around the filament.

Clause 4. The extrusion device of Clause 3, wherein the filament-engaging member comprises a thread.

Clause 5. The extrusion device of Clause 4, wherein the thread is self-tapping or self-starting.

Clause 6. The extrusion device of Clause 3, further comprising a second filament-engaging member.

Clause 7. The extrusion device of Clause 6, wherein the filament-engaging members are spaced equidistant about circumference of the passage.

Clause 8. The extrusion device of Clause 1, wherein the motor comprises a rotor having a passage therethough, and the passage of the rotor is (i) sized to receive the filament and (i) disposed on a common filament path with the passage of the driver.

Clause 9. The extrusion device of Clause 8, further comprising a fan positioned surrounding and attached to the rotor.

Clause 10. The extrusion device of Clause 8, wherein the rotor comprises the driver.

Clause 11. The extrusion device of Clause 8, further comprising a bearing surrounding and engaging an end segment of the rotor.

Clause 12. The extrusion device of Clause 11, further comprising a planetary gear train having a sun gear, planet gears, and an annular gear, and wherein the bearing is positioned in and engages the annular gear, and sun gear is fixedly attached to the rotor.

Clause 13. The extrusion device of Clause 1, wherein the driver is coupled with the motor by a gear train.

Clause 14. The extrusion device of Clause 13, wherein the gear train comprises a sun gear, planet gears, and an annular gear.

Clause 15. The extrusion device of Clause 13, further comprising a carrier holding the driver, the carrier comprising a driven gear exterior to the passage.

Clause 16. The extrusion device of Clause 1, wherein the driver comprises a first end and a second end opposite the first end, and the passage extends from the first end to the second end.

Clause 17. The extrusion device of Clause 1, wherein the driver comprises an annulus surrounding the passage.

Clause 18. The extrusion device of Clause 17, wherein the annulus comprises a plurality of components, the plurality of components comprising a first portion and a second portion separate from the first portion, the first portion and the second portion opposing each other across the passage.

Clause 19. The extrusion device of Clause 18, wherein the first portion and the second portion are elastically urged together.

Clause 20. The extrusion device of Clause 19, wherein the driver further comprises fasteners coupling the first portion and the second portion, and the first portion and the second portion are elastically are urged together by springs.

Clause 21. The extrusion device of Clause 1, wherein the driver is positioned between the motor and the heater.

Clause 22. The extrusion device of Clause 1, wherein the motor operates by direct electrical current.

Clause 23. The extrusion device of Clause 22, wherein the motor is not a stepper motor.

Clause 24. An extrusion device comprising:

an outlet;

a motor;

a driver having an internally threaded passage extending therethrough; the driver operatively coupled with the motor such that the driver is rotated about an axis by operation of the motor, the axis extending through the passage, wherein rotation of the driver urges a filament along the axis within the passage, the driver positioned such that movement of the filament along the axis in a first direction is toward the outlet;

a heater configured to melt the filament and disposed between driver and the outlet such that the filament is advanced into the heater by the driver.

Clause 25. The extrusion device of Clause 24, wherein the filament-engaging member protrudes into the passage.

Clause 26. The extrusion device of Clause 24, wherein the filament-engaging member engages the filament along a helical path around the filament.

Clause 27. The extrusion device of Clause 26, wherein the filament-engaging member comprises a thread.

Clause 28. The extrusion device of Clause 27, wherein the thread is self-tapping or self-starting.

Clause 29. The extrusion device of Clause 26, further comprising a second filament-engaging member.

Clause 30. The extrusion device of Clause 29, wherein the filament-engaging members are spaced equidistant about circumference of the passage.

Clause 31. The extrusion device of Clause 24, wherein the motor comprises a rotor having a passage therethough, and the passage of the rotor is (i) sized to receive the filament and (i) disposed on a common filament path with the passage of the driver.

Clause 32. The extrusion device of Clause 31, further comprising a fan positioned surrounding and attached to the rotor.

Clause 33. The extrusion device of Clause 31, wherein the rotor comprises the driver.

Clause 34. The extrusion device of Clause 31, further comprising a bearing surrounding and engaging an end segment of the rotor.

Clause 35. The extrusion device of Clause 34, further comprising a planetary gear train having a sun gear, planet gears, and an annular gear, and wherein the bearing is positioned in and engages the annular gear, and sun gear is fixedly attached to the rotor.

Clause 36. The extrusion device of Clause 24, wherein the filament driver is coupled with the motor by a gear train.

Clause 37. The extrusion device of Clause 36, wherein the gear train comprises a sun gear, planet gears, and an annular gear.

Clause 38. The extrusion device of Clause 36, further comprising a carrier holding the driver, the carrier comprising a driven gear exterior to the passage.

Clause 39. The extrusion device of Clause 24, wherein the driver comprises a first end and a second end opposite the first end, and the passage extends from the first end to the second end.

Clause 40. The extrusion device of Clause 24, wherein the driver comprises an annulus surrounding the passage Clause 41. The extrusion device of Clause 40, wherein the annulus comprises a plurality of components, the plurality of components comprising a first portion and a second portion separate from the first portion, the first portion and the second portion opposing each other across the passage.

Clause 42. The extrusion device of Clause 41, wherein the first portion and the second portion are elastically urged together.

Clause 43. The extrusion device of Clause 42, wherein the driver further comprises fasteners coupling the first portion and the second portion, and the first portion and the second portion are elastically are urged together by springs.

Clause 44. The extrusion device of Clause 24, wherein the driver is positioned between the motor and the heater.

Clause 45. The extrusion device of Clause 24, wherein the motor operates by direct electrical current.

Clause 46. The extrusion device of Clause 45, wherein the motor is not a stepper motor.

Clause 47. A method for extruding material, the method comprising:

introducing a filament into a passage having a thread therein sized to engage the filament;

advancing the filament into a heater by rotating the thread;

melting material of the filament; and extruding the melted material through an outlet.

Clause 48. The method of Clause 47, wherein the thread is rotated about an axis intersecting the passage.

Clause 49. The method of Clause 47, further comprising advancing the filament through a motor rotating the thread.

Clause 50. The method of Clause 49, further comprising rotating the thread at a lower speed than a speed at which a rotor of the motor is rotating.

Clause 51. The method of Clause 47, further comprising advancing a filament through a fan.

Clause 52. The method of Clause 50, further comprising spinning the fan with a rotor of a motor.

Clause 53. The method of Clause 47, wherein advancing the filament into the heater comprises applying pressure along at least one fifth of a full revolution of a helical path along an outer surface of the filament.

Clause 54. The method of Clause 47, further comprising applying force to multiple regions circumferentially spaced around the filament.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the subject technology as claimed.

BRIEF DESCRIPTION OF THE DRAWINGS

The accompanying drawings, which are included to provide further understanding of the subject technology and are incorporated in and constitute a part of this description, illustrate aspects of the subject technology and, together with the specification, serve to explain principles of the subject technology.

FIG. 6 is an exploded perspective view of certain components shown in FIGS. 5A and 5B.

FIG. 8 is a rear view of the assembly shown in FIG. 7.

FIG. 9 is a cross-sectional view, taken along section line 9-9 in FIG. 8, of the assembly shown in FIGS. 7 and 8, and additionally illustrating a support bearing.

FIGS. 10A-F are perspective, top, side, front, cross-sectional, and bottom views of a two-piece, inner drive component.

DETAILED DESCRIPTION

In the following detailed description, specific details are set forth to provide an understanding of the subject technology. It will be apparent, however, to one ordinarily skilled in the art that the subject technology may be practiced without some of these specific details. In other instances, well-known structures and techniques have not been shown in detail so as not to obscure the subject technology.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such "an embodiment" may refer to one or more embodiments and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

Figure 1:
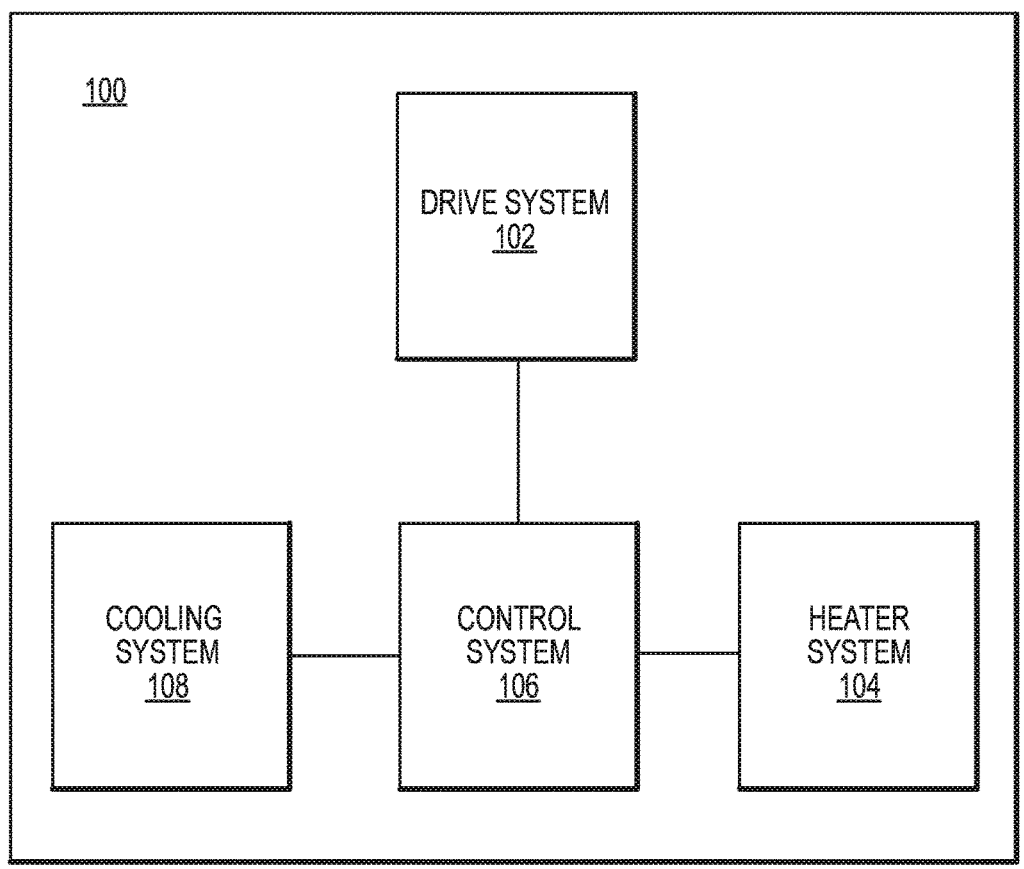
FIG. 1 is a schematic block diagram of an exemplifying extrusion device, illustrating various systems thereof, according the subject technology.

FIG. 1 is a schematic block diagram of an extrusion device 100 in accordance with various embodiments of the subject technology. The extrusion device can be operable for 3D drawing, e.g., by a user supporting the device with a single hand or more than one hand. The extrusion device can be configured in the form of a pen. The system 100 illustrated in FIG. 1 includes a drive system 102, a heater system 104, and a control system 106. In some embodiments, such as that illustrated in FIG. 1, the system 100 can include a cooling system 108. The cooling system 108 can move air to cool the drive system, heater system, or control system, or a combination of some or all of them. The drive system 102 urges a filament toward the heater system 104. The heater system 104 is configured to melt a filament, and direct the melted material of the filament to an outlet. The control system 106 controls operation of the drive system 102, the heater system 104, the cooling system 108, or any combination thereof in response to operation of an input mechanism.

Figure 2:
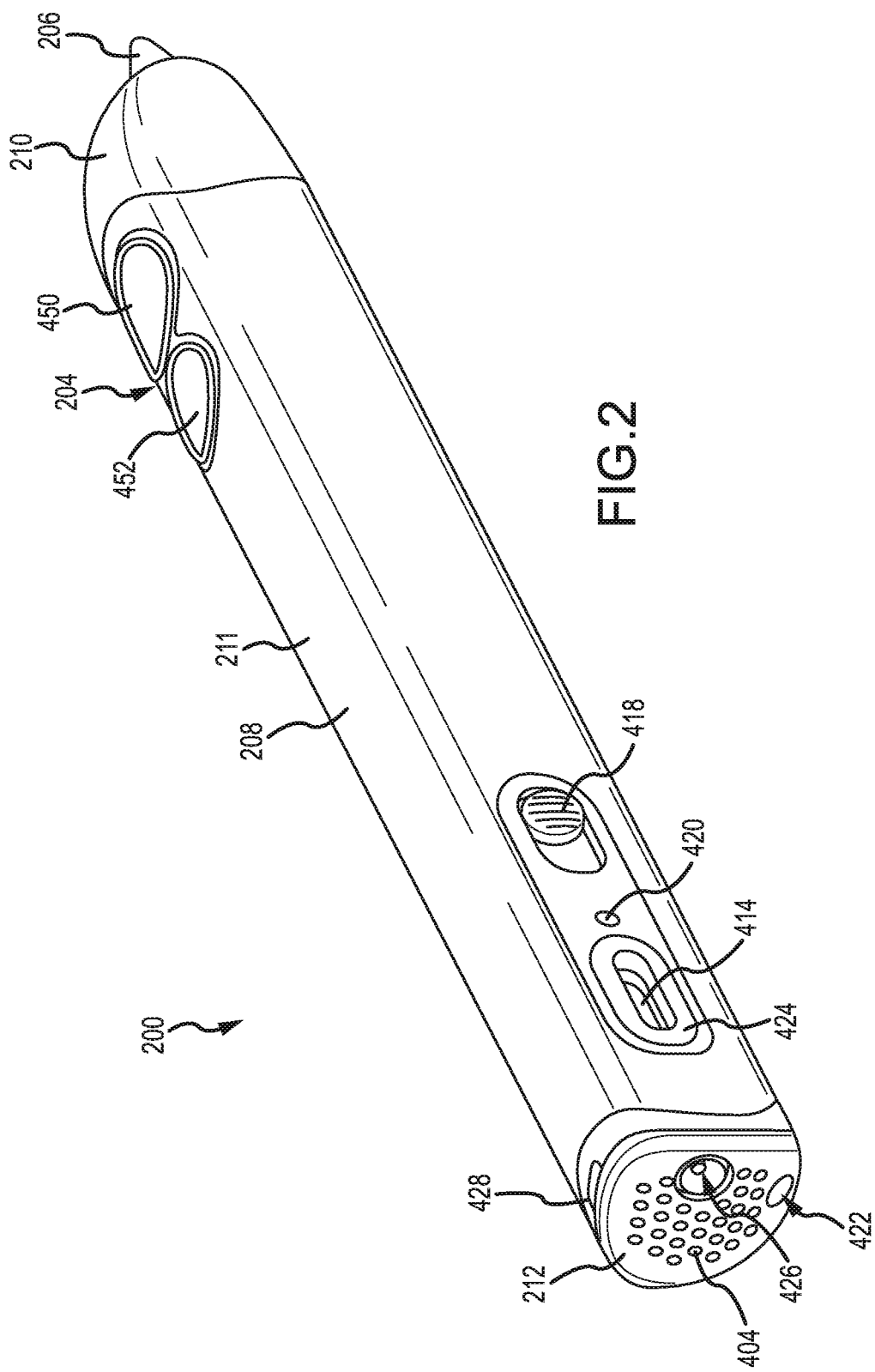
FIG. 2 is a rear perspective view of an extrusion device in accordance with aspects of the present disclosure.
Figure 3:
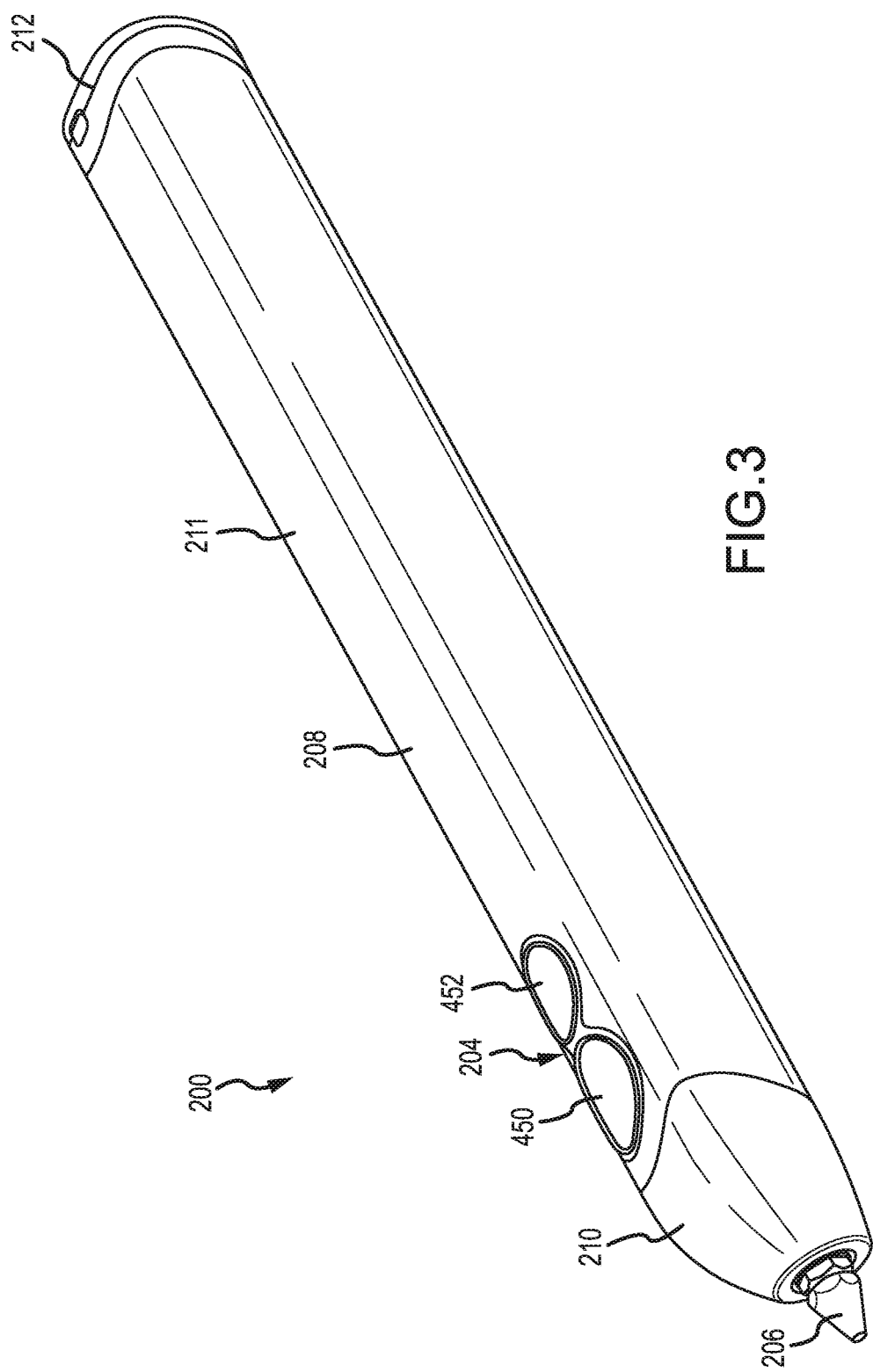
FIG. 3 is a front perspective view of the extrusion device of FIG. 2.

FIGS. 2-9 illustrate an exemplifying extrusion device 200 according to some aspects of the subject technology, for 3D drawing by a user supporting the device with a single hand or more than one hand. The extrusion device 200 can shaped as a pen, for example as illustrated in FIGS. 2 and 3, that can be held in a hand of a user and manipulated to extrude a melted filament and arrange the extruded material of the melted filament free-hand in a three dimensions. The extrusion device 200 comprises an input mechanism 204, an outlet 206, and a housing 208. The housing can have a front cover 210, a middle cover 211, and a rear cover 212. Although the housing 208 illustrated in FIGS. 2 and 3 comprises a housing including three components, the housing 208, if included, can be formed of other numbers of components, such as a single component or any numbers of multiple components.

Figure 4:
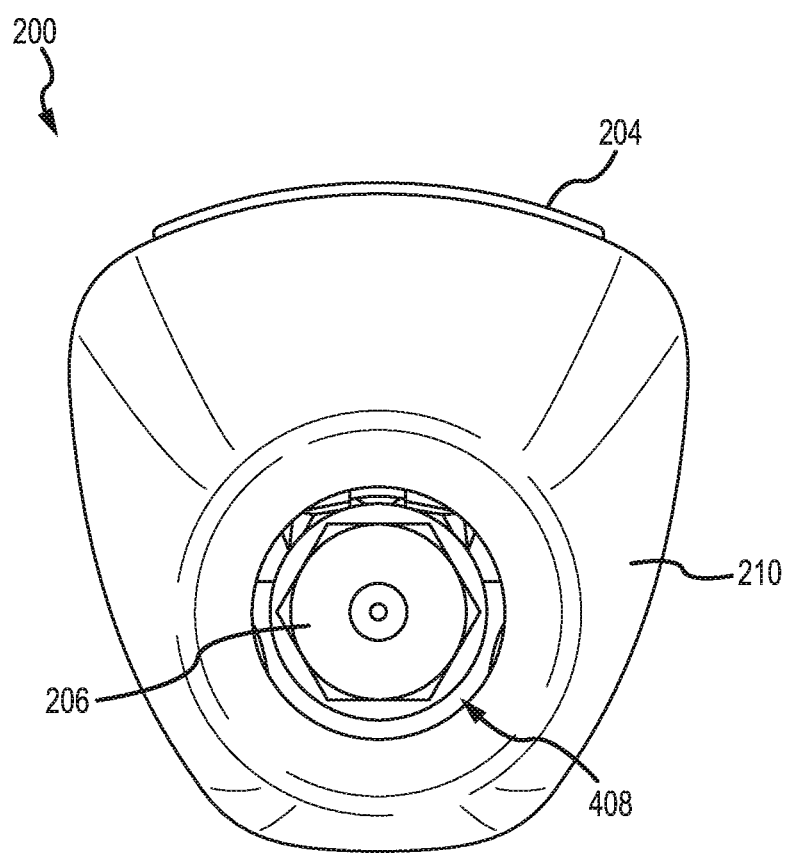
FIG. 4 is a front view of the extrusion device of FIGS. 2 and 3.
Figure 5A:
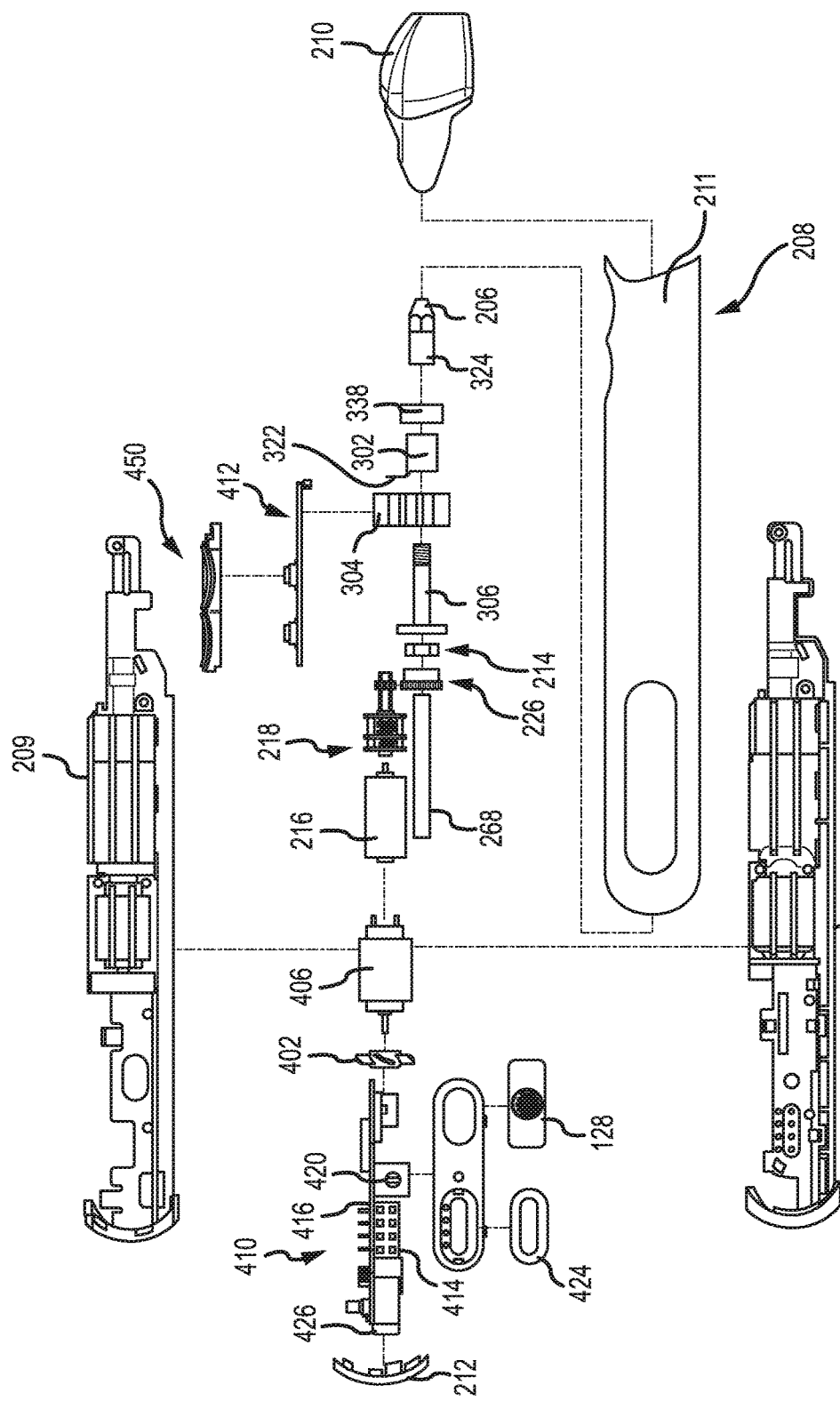
FIG. 5A is an exploded side view of the extrusion device of FIGS. 2-4.
Figure 5B:
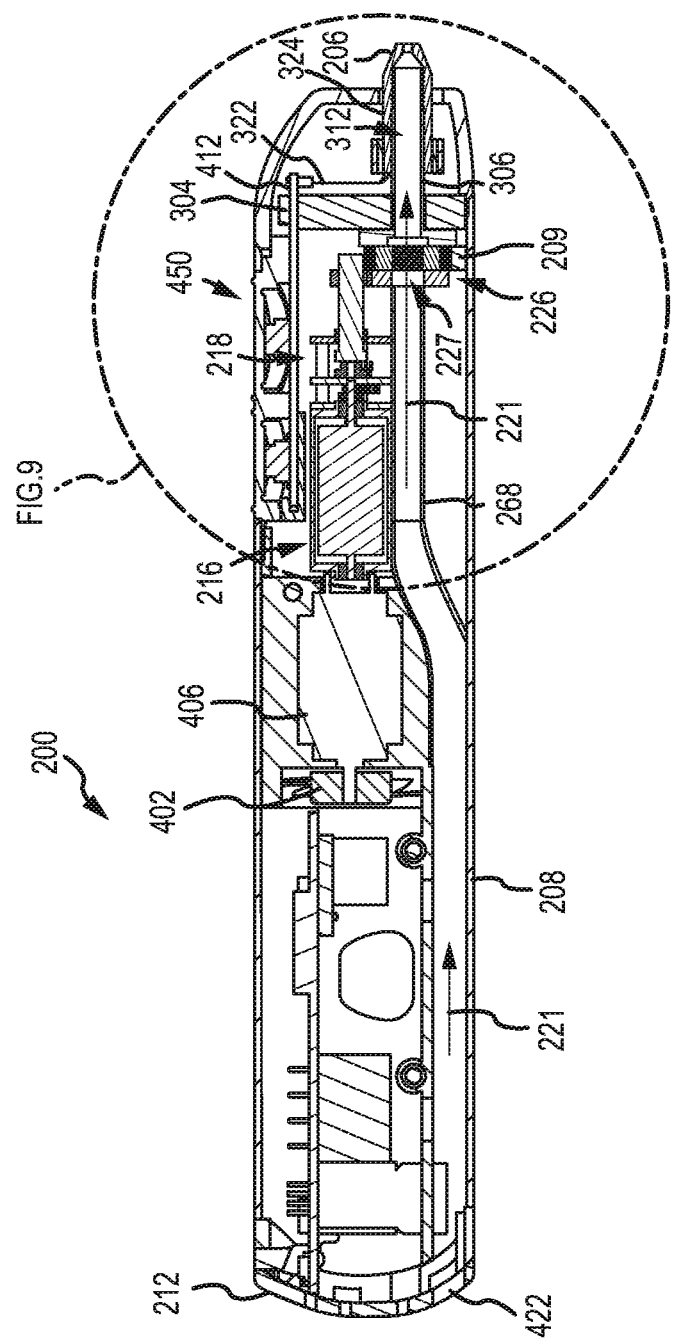
FIG. 5B is a cross-sectional view of the extrusion device of FIGS. 2-5A.

FIGS. 5A and 5B are respectively an exploded side view and a cross-sectional view of the extrusion device 200 of FIGS. 2-4, and illustrate components of the drive, heater, control, and cooling systems of the extrusion device 200. As illustrated in FIGS. 5A and 5B, the drive system 102 can comprise, for example, a driver 214 and a motor 216. The driver 214 is configured to engage a filament to move the filament relative to the extrusion device. The drive system 102 optionally can further comprise a power transmission system 218, such as, for example, a gear train.

Figure 7:
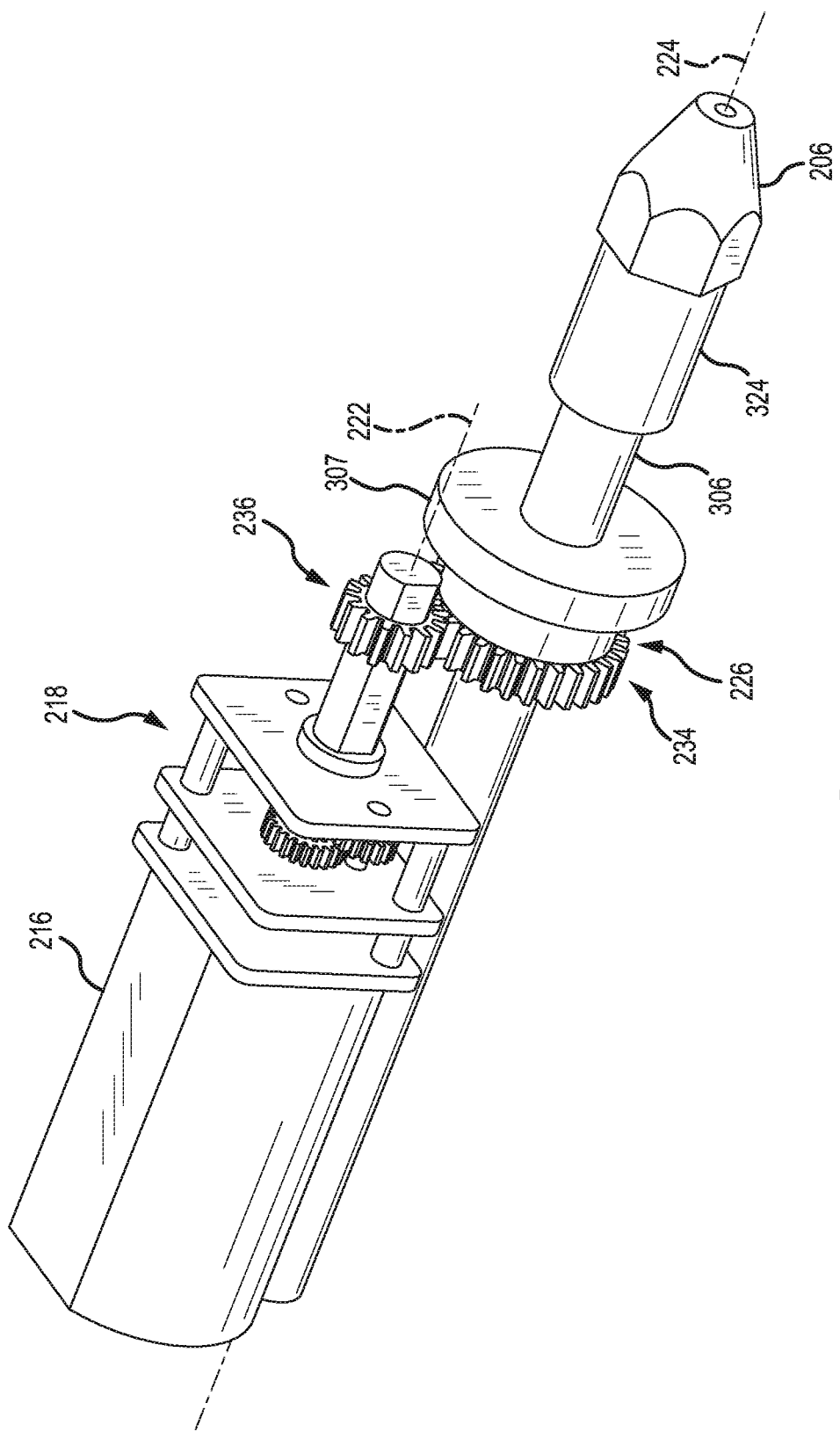
FIG. 7 is an assembled perspective view of the components shown in FIG. 6.

As shown, for example, in FIGS. 7-9, the driver 214 is operatively coupled with the motor 216. The driver 214 can be operatively coupled to a motor 216 directly or through the power transmission system 218, if present. The power transmission system 218 can comprises a single component or a plurality of components. In some embodiments, the power transmission system 218 includes a single gear or a gear train. FIGS. 5A-9 illustrate a gear train according to some aspects of the subject technology. In some embodiments, the motor 216 and driver 214 rotate together at a 1:1 ratio. In some embodiments, the power transmission system 218 provides a mechanical advantage to the driver 214 and rotates the driver 214 at a lower speed than a speed at which a rotor of the motor is rotating. The power transmission system 218, if present, can attach directly or indirectly to each or either of the driver 214 and the motor 216.

In some aspects of the subject technology, the motor 216 operates by electrical power. For example, the motor 216 can operate on direct current or alternating current. In some aspects of the subject technology, the motor 216 is not a stepper motor. The motor 216 comprise a rotor 220 that rotates about an axis 222. If a power transmission system 218 is employed, the power transmission system can be operatively positioned between the rotor and the driver 214. In some such embodiments, the rotor can be fixedly attached to a driven portion of the power transmission system.

The motor 216 is operatively coupled to driver 214 such that the driver is rotated by operation of the motor. The driver 214 is rotated about an axis 224. In some aspects of the subject technology, the rotor rotation axis 222 and the driver rotation axis 224 are parallel or substantially parallel to, and offset from, each other, for example as illustrated in FIG. 7. The axes 222, 224 can be offset from each other in a direction perpendicular to them.

The driver 214 can be held by a carrier 226. The carrier 226 can transmit power from the motor 216 to the driver 214. The carrier 226 can have a passage 227 configured to allow a filament to pass through it, and a receptacle 228 configured to receive therein the driver 214. An outer surface 230 of the driver 214 and an inner surface 232 of the carrier 226 can have complementary shapes. For example, as illustrated in FIG. 6, the outer surface 230 and the inner surface 232 can be shaped as hexagonal cylinders. The inner surface 232 of the carrier 226 can be slightly larger than the outer surface 230 of the driver 214 such that (i) the carrier 226 can be received in the receptacle 228 and (i) rotation of the carrier 226 rotates the driver 214. The shape and size of the receptacle can inhibit or prevent rotation of the driver 214 about the axis 224 within the receptacle 228.

The carrier 226 can comprise an outwardly facing gear 234 that operatively and directly engages a gear fixedly attached to the rotor 220 or a final gear 236 of the power transmission system 218. The carrier 226 can be supported by an annular bearing 238, such as a low-friction bushing or a ball bearing, as illustrated in FIG. 9. The bearing 238 can be held by the housing 208, the frame 209, or both, and rotatably support the carrier 226.

The driver 214 and the carrier 226 can each be made of metal, plastic, ceramic, or other material(s) or combinations thereof. In some embodiments, the driver 214 and the carrier 226 are made the same material, while they are made of different materials in other embodiments. In some embodiments, the driver 214 and the carrier 226 are formed as a single monolithic component.

As illustrated in FIGS. 6 and 9, the driver 214 has a first end 240, a second end 242 opposite the first end, and a passage 244 extending from the first end 240 to the second end 242. In some aspects of the subject technology, the driver to 14 forms an annulus completely surrounding the passage 244. The driver 214 can have a closed circumference around the passage 244. The closed circumference can extend along some or all of a length of the passage between the first end 240 and the second end 242.

The passage 244 illustrated in FIG. 9 extending along the rotation axis 224. The passage 244 can be positioned in the driver 214 such that the axis 224 extends through the passage 244. The axis 224 can intersect openings of the passage 244 at the first end 240 and the second end 242 of the driver 214. In some embodiments, the axis 224 intersects the passage 244 without intersecting the annulus of the driver. A central axis of the passage 224 can be parallel, substantially parallel, coincident, or substantially coincident with the axis of rotation 224 of the driver 214.

The driver 214 can comprise a filament-engaging member 246 in an interior of the passage 244. The filament-engaging member 246 can comprise a thread, for example the passage 244 of the driver 214 is illustrated in FIGS. 6 and 9 as internally threaded. In some embodiments, the driver 214 can comprise, two or three or more filament-engaging members, e.g., threads, in the interior of the passage 244.

The filament-engaging member 246 can be configured to engage a filament extending through the passage 244 such that rotation of the driver 214 moves the filament relative to the driver 214. In some aspects of the subject technology, the filament-engaging member(s), e.g., thread(s), protrudes radially and inwardly into the passage toward the axis of rotation 224 of the driver 214. The filament-engaging member(s) can be sized to partially or fully penetrate into a filament positioned in the passage. For example, a nominal inner diameter of the filament-engaging member(s) can be smaller than a nominal outer diameter of the filament. In some embodiments, the filament-engaging member(s) can be self-tapping or self-starting, such as self-tapping or self-starting threads.

In some embodiments, the filament-engaging member(s) can extend helically around an inner surface of the passage 244 so as to engage, and apply driving pressure to, a filament along a helical path around the outer surface of the filament. The helical path of engagement between the filament-engaging member(s) and the filament can extend around the circumference of the filament by at least one-fifth, one-quarter, one-half, two-thirds, or three-quarters of a full revolution of a helix. In some embodiments, the helical path of engagement extends completely around the circumference of the filament by a full revolution of a helix. An axis of the helix can be parallel, substantially parallel, coincident, substantially coincident with the central axis of the passage 224, the axis of rotation 224 of the driver 214, or both. In some aspects of the subject technology, distribution of driving pressure along a helical path (e.g., along a full revolution of a helix, or at least one-fifth, one-quarter, one-half, two-thirds, or three-quarters of a full revolution of a helix) around the circumference of the filament can, (i) permit elimination of a component applying pressure against the filament to urge the filament against a filament driver of the extrusion device, (ii) increase an amount of driving pressure that can be applied to the filament, (iii) improve control of filament movement relative to the extrusion device, (iv) allow use of filament materials having a wider range of hardness, toughness, and strength with the same filament driver, or (v) a combination of some or all of (i)-(iv).

In embodiments comprising plural filament-engaging members, the filament-engaging members can be spaced around a circumference of the filament. The filament-engaging members can engage and apply pressure to the filament at regions spaced, evenly (e.g., equidistant) or unevenly, around a circumference of the filament, as viewed in cross-section through the filament perpendicular to a longitudinal axis of the filament. The filament-engaging members can extend some or all of the length of the passage between the first end 240 and the second end 242. The filament-engaging member(s), e.g., thread(s), can be continuous or discontinuous along the length of the driver 214.

A portion of the driver 214 can include a heat-insulating coating. In some embodiments, the heat-insulating coating comprises polytetrafluoroethylene (PTFE) or a material having a PTFE-based formula, such as, for example, Teflon®. The heat-insulating coating, if present, can be limited to the filament-engaging member(s), the portion of the driver 214 between the filament-engaging member(s), or the entire outer surface of the driver 214. In some embodiments, the passage 244 through the driver 214 can be covered, partially or completely, with such a heat-insulating coating.

The driver 214 can consistent of a single monolithic component or comprise a plurality of assembled components. FIGS. 6 and 9 illustrate an example of a driver 214 formed as a single monolithic component, to which a heat-insulating coating optionally can be applied over some or the entire the surface area. FIGS. 10A-10F illustrate an example of a driver 214 comprising an assembly of components. As with the driver 214 illustrated in FIGS. 6 and 9, a heat-insulating coating optionally can be applied to the some or the entire the surface area of the driver 214 illustrated in FIGS. 10A-10F.

The driver illustrated in FIGS. 10A-10F comprises a first portion 252 and a second portion 254 that, when assembled, together form an annulus surrounding and defining the passage 244. One or more fasteners 256, e.g., bolts or screws, can be used to attach the first portion 252 and the second portion 254. For example, FIGS. 10A-10F schematically illustrate two fasteners 256 in the form of bolts coupling the first portion 252 and second portion 254 together in an assembly. The fasteners 256 can extend through openings 258 of the first portion 252 to engage threaded passages 260 of the second portion 254. The fasteners 256 can pass freely through the openings 258 or engage with threads in the openings 258. A spring 262 optionally can be positioned between, and contacting each of, a bolt head 264 and a surface 260 (e.g., on a shoulder or flange 266) of the first portion 252. The springs 262 can allow the first portion 252 and the second portion 254 to move away from each other (compressing the springs) to enlarge the passage 244. The springs 262 can provide a restorative force to move the first portion 252 and the second portion 254 into full contact with each other, and reduce a size of the passage 244. Although not shown, the receptacle 228 of the carrier 226 can be shaped to receive the driver 214 illustrated in FIGS. 10A-10F.

In FIGS. 5A-9, the driver 214 is shown positioned between (i) the motor 216 and (ii) components of the heater system, such as, for example, a heater 302, a heater mass 324, or a tube 306. However, some embodiments can have other relative positions of the driver 214 and the motor 216. For example, in some embodiments, the motor 216 can be positioned between (i) the driver 214 and (ii) components of the heater system, such as, for example, a heater 302, a heater mass 324, or a tube 306.

The driver 214 is positioned such that a first direction of rotation about the axis 224 urges, and preferably moves, the filament through the passage toward the outlet 206 (e.g., of a nozzle). Rotation of driver 214 in a second direction of rotation, opposite the first direction of rotation, about the axis 224 urges, and preferably moves, the filament through the passage away from the outlet 206. The driver 214 can be positioned so that a path 221 of filament travel through the device 200 extends through the passage 244 and from the passage to the outlet 206. In some embodiments, the driver 214 and the outlet 206 are arranged on a straight line, which may be coincident with the axis 224, extending through the passage 244.

As illustrated for example in FIGS. 2-5, the extrusion device 200 can comprise a frame 209 and a housing 208 disposed around the frame. The housing 208 can include openings at opposing ends. The housing 208 comprises a front cover 210 disposed at a front end, a rear cover 212 disposed at a rear end, and a middle cover 211 between the front and rear covers. The rear cover 212 has an aperture 422 (FIG. 2) through which the filament can be inserted into the extrusion device 200.

The path 221 of filament travel extends from the aperture 422 to the outlet 206. The path 221 of filament travel within the extrusion device 200 can be defined in part by the housing 208, the frame 209, or a combination thereof. A tube 268 can extend from the aperture 422 to a location proximate the driver 214 and/or the carrier 226. The tube 268 can be positioned along the path 221 of filament travel through the device 200 with one end of the tube 268 disposed adjacent the aperture 422 and the other end of the tube 268 disposed proximate, and preferably adjacent to, the passage 244 of the driver 214, the passage 227 of the carrier 226, or both. In some embodiments comprising the tube 268, as the filament moves from the aperture 422 toward the outlet 206 when inserted into the aperture, the filament enters the tube upon passing through the aperture 422. Further movement of the filament toward the outlet 206, whether pushed by a user, pulled by the driver 214, or both, positions the filament in the passage 244 of the driver 214. The filament can enter the passage 227 of the carrier 226, before, after, or simultaneously with entry into the passage 244 of the driver 214.

The filament is urged by the driver 214 into the heater system 104. In some embodiments, the heater system 104 can comprise a heating element and a heater mass 324. A heater 302 can comprise the heating element (e.g., a wire), which can be metal, such as, for example, nichrome. The heater 302 can be in the form of a wrap or band. The heating element can be attached to a film. The film can comprise a polymer, such as, for example, polyimide. In some embodiments, the film comprises DuPont Kapton® polyimide film. In some embodiments, the heating element can be embedded in the film. In some embodiments, the heater system 104 can comprise a ceramic heater, e.g., a heater having a wire embedded in ceramic material or a positive temperature coefficient (PTC) heater.

The heater mass 324 can have a passage 330 extending there through. The heater 302 can be coupled to the heater mass 324. The heater 302 can be attached directly to the heater mass 324, by the film, a bonding agent, or a combination thereof. The bonding agent can be a thermally conductive compound, which may be an adhesive. The heating element receives electrical energy through a pair of leads 322 attached thereto. Heat generated by heating element is transferred to the heater mass 324, directly or, if present, the film and/or bonding agent. The heater mass 324 conducts heat received from the heating element to the filament.

The heater mass 324 can act as a thermal capacitor, storing heat received from the heating element and distributing the heat around the filament. The heat received by the filament causes the material of the filament to melt, changing phase from solid to liquid. The melted material of the filament is then extruded through the outlet 206. In some embodiments, the heating element and heater mass 324 can be formed as a single component. The heater mass 324 can be a single component or a plurality of component. In some embodiments, the heating element comprises a wire wound around the heater mass 324, the outlet 206, a tube 306, or other component(s) surrounding segment of the path 221 of filament travel.

The heater mass 324, if present, can be attached, directly or indirectly, to the outlet 206. In some embodiments, the heater mass 324 can be integrally formed with the outlet 206 as a monolithic structure. In other embodiments, the heater mass 324 can be formed separately from the outlet 206, and the heater mass 324 and the outlet 206 can be coupled directly or indirectly, though another component, by suitable engagement features.

The heater mass 324 can be configured to attach to a tube 306, shown for example in FIG. 9. The combined heater mass 324 and outlet 206 can comprise an attachment portion 328 within the passage 330. The attachment portion 328 can be disposed at or near an end of the passage 330, e.g., an end closer to the outlet 206. The attachment portion 328 includes features, e.g., threads, extending along the inner surface of the passage 330, for attachment to the tube 306.

FIG. 9 illustrates the tube 306 comprising a passage 312 and an attachment portion 340. The attachment portion 340 includes features, such as, for example, threads extending along an outer surface of the tube 306, configured to mate with attachment portion 328, e.g., threads, of the combined heater mass 324 and outlet 206. The tube 306 can extend into the passage 330 of the combined heater mass 324 and outlet 206 for engagement of the attachment portions 328, 340.

The tube 306 can be positioned so that the path 221 of filament travel through the extrusion device extends through the passage 312. The passage 312 can be positioned close to the passage 244 of the driver 214 so that the filament enters the passage 312 as it exits, or shortly after exiting, the passage 244. The driver 214 and the tube 306 can be positioned relative to each other such that a central axis of the passage 312 and the axis 224 of the driver are collinear, substantially collinear, coincident, or substantially coincident.

The outlet 206 can comprise a tapered portion 342 (FIG. 9). The melted material of the filament is received into the tapered portion 342 of the outlet 206. The tapered portion 342, having a cross-section that reduces with proximity to the exit of the outlet, directs the melted material to the outlet exit. In some embodiments, the outlet 206 can comprise a nozzle, a sleeve, or a tapered body having a passage therethrough. In some embodiments, the outlet 206 can be unitarily formed with the heater mass 324, for example as illustrated in FIGS. 6, 7, and 9.

In some embodiments, a retainer 338 (FIGS. 5A and 5B) can be disposed around the heater mass 324. The retainer can be configured to aid, reinforce, or protect coupling of the heating element to the heater mass 324. The retainer 338 can be ring-shaped and disposed around the heater mass 324 with the heating element between the retainer 338 and the heater mass 324. The retainer 338 in various embodiments can extend partially or entirely around the circumference of the body portion 326. In some embodiments, the retainer 338 can comprise an adhesive or tape. The retainer 338 can be insulating in some embodiments.

The heater mass 324 can be connected, directly or indirectly, to a heat sink 304 (FIGS. 5A, 5B, and 9). The heater mass 324 can be connected to the heat sink 304 by the tube 306, if present. The heater mass 324 can be separated from the heat sink 304 by a segment of the tube 306, if present. The tube 306 can comprise or consist of stainless steel, aluminum, copper, brass, ceramic, or a combination thereof. In some embodiments, the tube can comprise a flange 307 at or near an inlet end of the tube and extending partially or completely around the inlet end. In some embodiments, the flange 307 can support the driver 214, the carrier 226, or both, in addition or alternative to any support provided to one or both of them by the annular bearing 238.

In some embodiments, the heat sink 304 and the tube 306 can be integrally formed as a single monolithic component. In some embodiments, the tube 306 and the heater mass 324 can be integrally formed as a single monolithic component. In some embodiments, the heat sink 304, the tube 306, and the heater mass 324 can be integrally formed as a single monolithic component. In some embodiments, the tube 306 can be attached to the heat sink 304 and the heater mass 324 by, for example, brazing, welding, press fit, adhesive, or other method.

The heat sink 304 can comprise a body, and a passage extending through the body to receive a section of the tube 306. The heat sink can partially or completely surround the segment of the tube 306 extending through it. The heat sink can comprise a plurality of fins disposed around its perimeter. The fins can increase the surface area available for heat dissipation.

The tube 306 can be disposed in the passage of the heat sink 304. In some embodiments, a first portion of the tube can be disposed in the passage of the heat sink 304 and a second portion of the tube can extend from the heat sink 304 toward the outlet 206 to the heater mass 324.

A portion of the inside surface of the tube 306 can comprise a coating. The coating can be heat-insulating, lubricous, or both. In some embodiments, the coating comprises PTFE or a material having a PTFE-based formula, such as, for example, Teflon®. In some embodiments, the distance that the coating extends within the tube 306 is sufficient, and the coating is positioned within the tube, such that when the tube 306 and heat sink 304 are assembled, the coating spans the length of the passage heat sink. In some embodiments, the coating can extend a distance greater than the length of the passage heat sink.

In some embodiments, a side of the heat sink 304 closer to the driver 214 can have a coating, similar to the coating of the tube 306. The coating can be heat-insulating, lubricous, or both. In some embodiments, the coating comprises PTFE or a material having a PTFE-based formula, such as, for example, Teflon®. In some embodiments, the coating covers an entire surface area of the heat sink 304 facing toward the driver 214.

A top portion of the heat sink 304, between the lateral sides, can comprise a retaining feature configured to retain a printed circuit board (PCB) 412 (FIGS. 5A, 5B, and 9). The retaining feature can comprise a pair of rails. In some embodiments, the PCB is disposed between the rails.

The heat sink 304 can be disposed between the driver 214 and the outlet 206, as illustrated for example in FIGS. 5A, 5B, and 9. The heat sink 304 can be disposed between the driver 214 and the heater 302. The heat sink 304 is aligned with the driver 214 and tube 306 such that a filament urged toward the outlet 206 by the driver 214 enters the tube 306.

In some embodiments, the extrusion device 200 comprises a cooling system 108. The cooling system 108 can comprise an impeller 402 driven by a fan motor 406. The impeller 402 can be configured to draw air into the housing 208 through apertures 404 in the housing 208. In some embodiments, the apertures are disposed through the rear cover 212.

The impeller 402 can direct air drawn into the housing 208 toward the outlet 206 and along the drive system 102 and heater system 104 to cool them. Air moving through the housing 208 toward the outlet 206 passes over the heat sink 304, facilitating dissipation of heat. The air is pushed out of the housing 208 through an annular space 408 (see FIG. 4)

between (a) the heater mass 324 and/or outlet 206 and (b) the housing 208, e.g., the front cover 210.

In some embodiments, the impeller 402 is driven by the drive system motor 216. In some embodiments, the impeller 402 is driven by power take-off of the drive system motor 216 or power transmission system 218.

The control system 106 of the extrusion device 200 is configured to control operation of the drive system 102 in response to operation of an input mechanism. The control system 106 can comprise one or more printed circuit boards (PCB's). FIGS. 5A, 5B, and 9 illustrate a main PCB 410 and a secondary PCB 412. Attached to the PCB's, e.g., the main PCB 410 and/or the secondary PCB 412, are a power port 426, a processor, memory, non-transitory computer-readable medium, and input mechanisms to control operation of the extrusion device 200. In some embodiments, the non-transitory computer-readable medium is configured for storage of programming, including, for example, heater control algorithms. In some embodiments, the input mechanisms attached to the main PCB 410 comprise a primary port 414, a secondary port 416, a switch 128, and a potentiometer, e.g., a variable resistor 420. In some embodiments, the main PCB 410 is positioned such that all of the input mechanism is accessible to a user, such as, for example, through corresponding openings in the housing 208. In some embodiments, the input mechanisms extend through the housing 208. In some embodiments, the secondary port 416 is concealed by a removable ring 424 disposed around the primary port 414. In certain embodiments, an indicator 428 (FIG. 2), for example an LED, can be provided to indicate that the extrusion device 200 is in a particular state of operation. In some embodiments, the power receptacle 426 extends through an opening in the rear cover 212.

The primary port 414 permits control of the extrusion device 200 using an input mechanism coupled to the primary port 414. For example, an input mechanism such as a personal computer, mobile phone, remote control, foot pedal, or other mechanism may be coupled to the primary port 414. The secondary port 416 permits access to a control system 106 of the extrusion device 200, for example to reprogram the processor and/or non-transitory computer-readable medium. The switch 418 changes the heater control algorithm between preset modes.

The secondary PCB 412, if present, is linked to the main PCB 410, for example by a data link or a bus. In some embodiments, the secondary PCB 412 is coupled to and supported by the rails 314 of the heat sink 304 and a portion of the power transmission system. In some embodiments, standoffs are disposed between the heat sink 304 and secondary PCB 412, and can inhibit or prevent heat transfer to the PCB. In some embodiments, the secondary PCB 412 is coupled to the housing 208 or other components of the extrusion device 200. The secondary PCB 412 can be attached to one or more input mechanism, and can be coupled to the leads 322 of the heating element 318.

In some embodiments, the secondary PCB 412 is operatively attached to an input mechanism configured to control operation of the drive system 102. The input mechanism 204 can comprise, for example, one or more buttons 450 positioned to allow the user to actuate them while holding and supporting the extrusion device 200 in a single hand, for example as illustrated in FIGS. 2 and 3. In embodiments that omit a secondary PCB 412, the disclosed features of the secondary PCB 412 can be incorporated in the main PCB 410. In embodiments that include a secondary PCB 412, any of the disclosed features of the secondary PCB 412 can be incorporated in the main PCB 410, or vice versa.

FIGS. 11-19 illustrate certain components, features, and aspects of drive, heater, and cooling systems of extrusion devices according to some aspects of the subject technology. Extrusion devices incorporating the components, features, and/or aspects illustrated in any of FIGS. 11-19 can comprise further components, features, and/or aspects, including, for example, housing components and components of the drive system 102, heater system 104, control system 106, cooling system 108, or a combination of any or all of such systems disclosed herein. The components, features, and aspects illustrated in FIGS. 11-19 can replace similar components, features, and aspects of the extrusion device illustrated in FIGS. 2-5. Thus, extrusion devices incorporating some or all of the components, features, and/or aspects illustrated in any of FIGS. 11-19 can comprise some or all of the components, features, and/or aspects illustrated in FIGS. 2-5 or otherwise disclosed herein. Accordingly, a detailed description of the components, features, and aspects illustrated in FIGS. 2-5 or discussed above is not repeated in connection with FIGS. 11-19.

FIGS. 11-15 illustrate certain components, features, and aspects of the drive system 102, heater system 104, and cooling system 108 of an extrusion device according to some aspects of the subject technology. FIGS. 11-15 illustrate the driver 214 and the motor 216 disposed relative to each other such that the axis of rotor rotation 222 and the access of driver rotation 224 are collinear and coincident. In some embodiments, these axes 222, 224 can be substantially collinear or substantially coincident.

Figure 11:
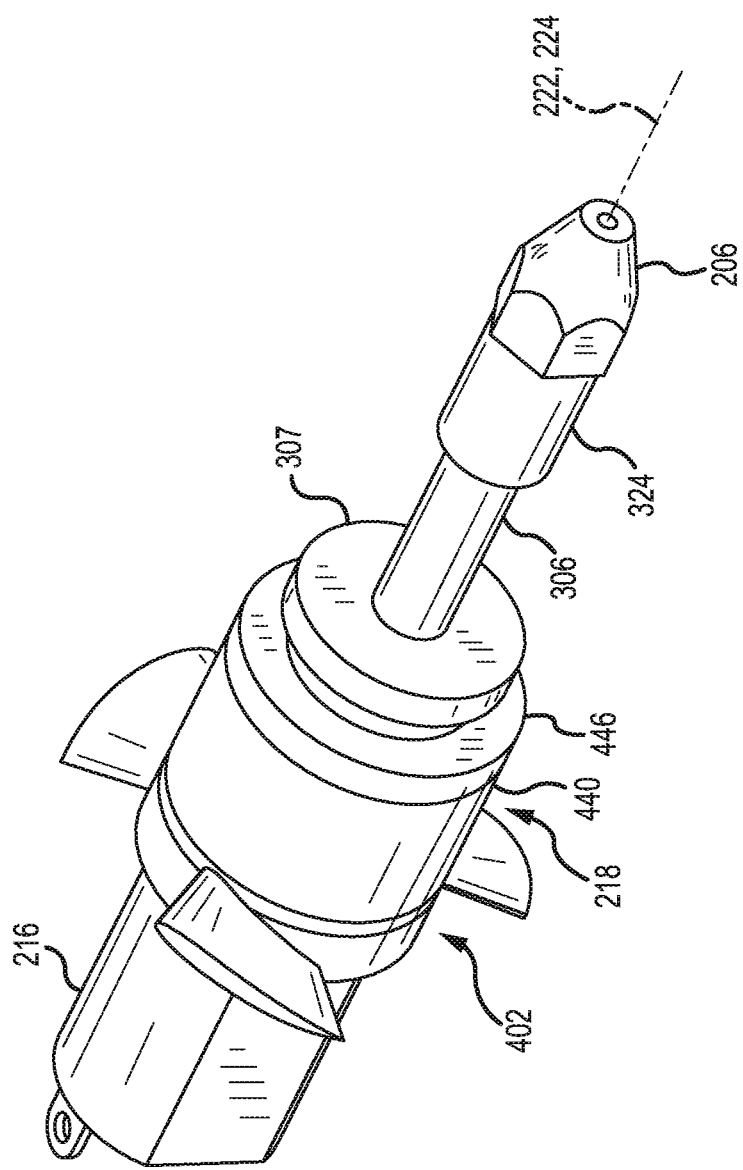
FIG. 11 is a front perspective view of an assembly of certain components of drive, heater, and cooling systems of an extrusion device according to some aspects of the subject technology.
Figure 12:
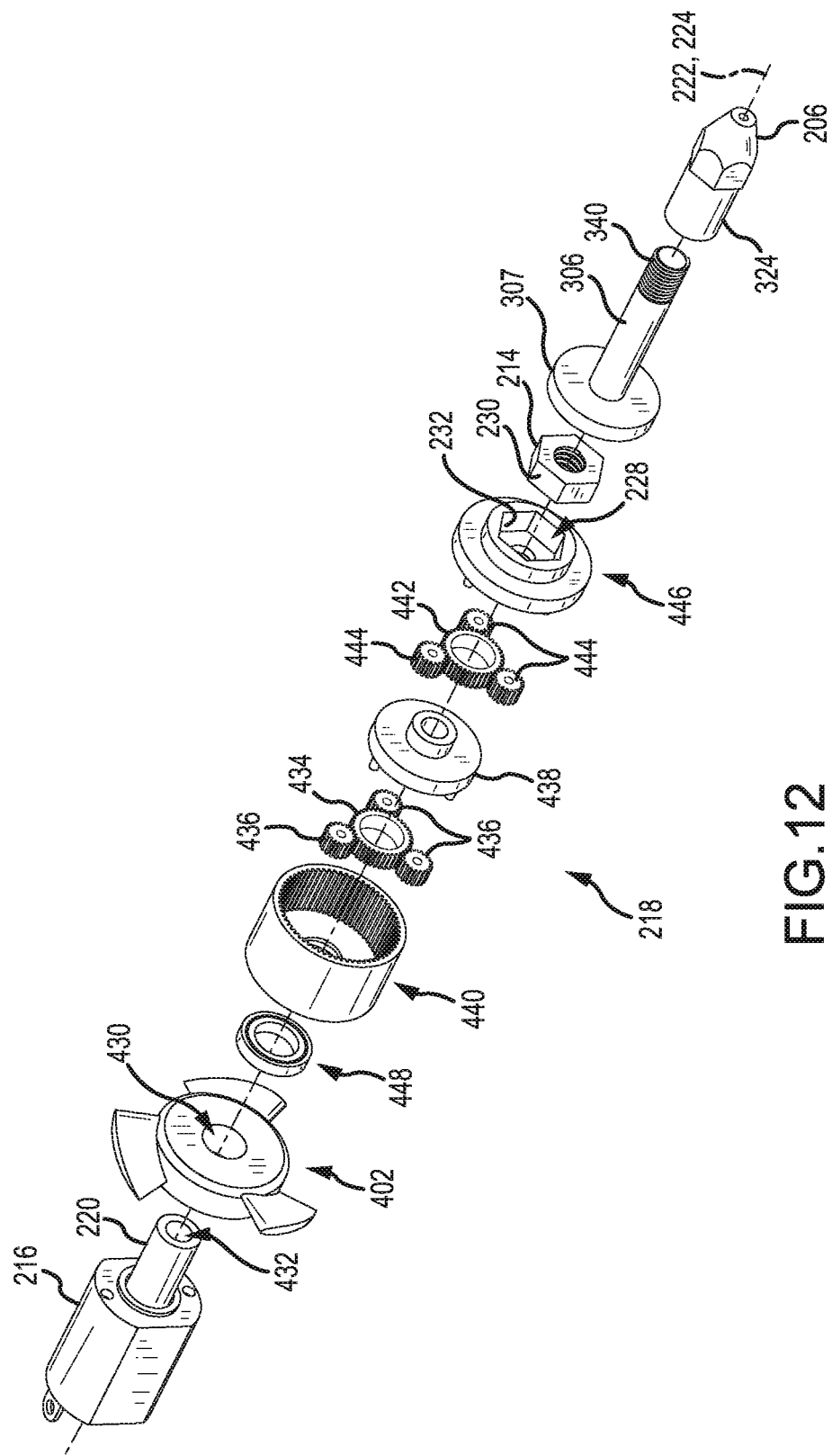
FIG. 12 is a front perspective, exploded view of the components shown in FIG. 11.
Figure 13:
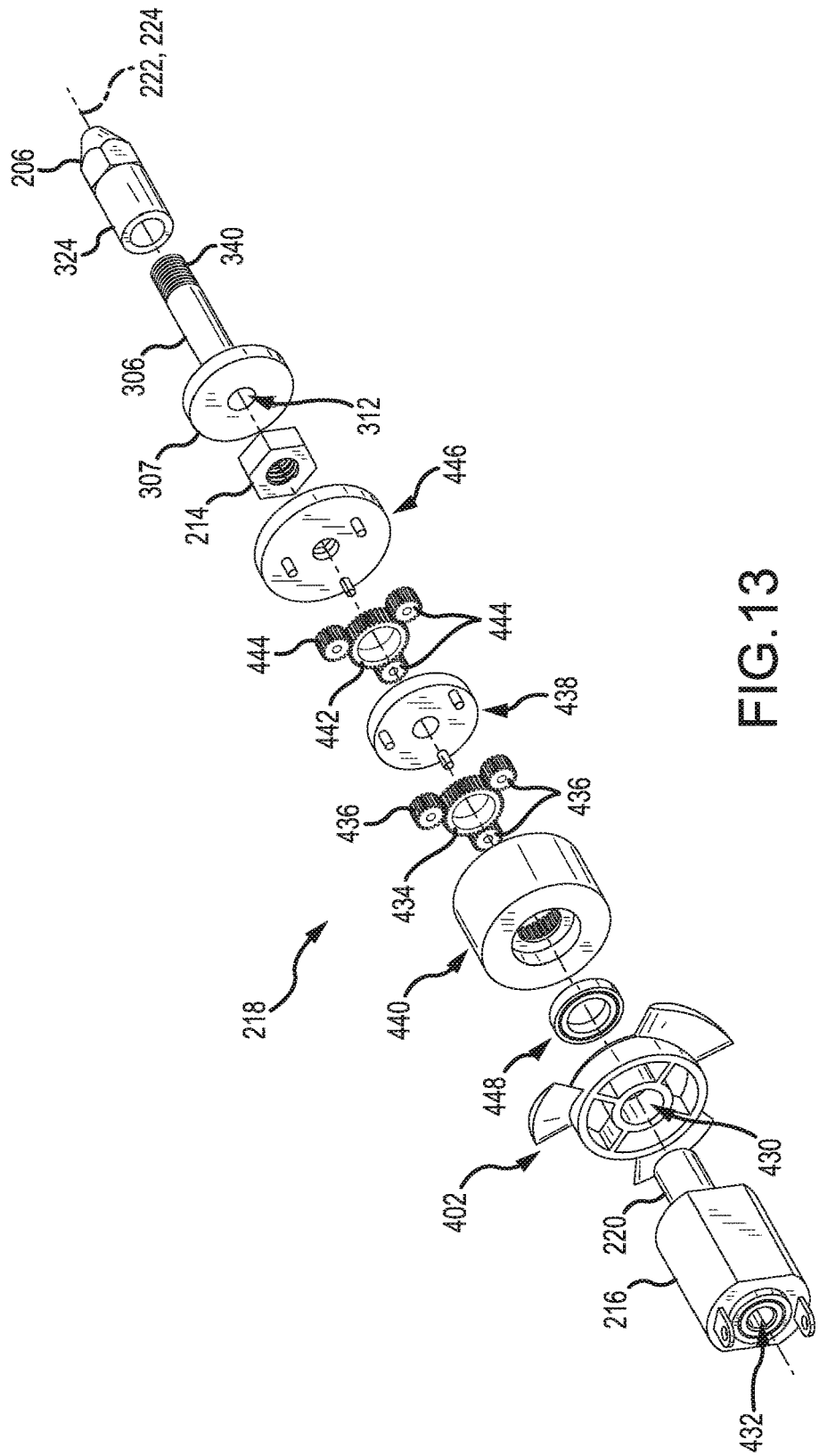
FIG. 13 is a rear perspective, exploded view of the components shown in FIGS. 11 and 12.

In some embodiments, the impeller 402 can be driven by the drive system motor 216, rather than a fan motor 406, which can be omitted. In some embodiments, the impeller 402 is driven by power take-off of the drive system motor 216 or power transmission system 218. As illustrated in FIGS. 11-15, the impeller 402 can be attached to, and driven by, the rotor 220 of the motor 216 to rotate the axis of rotor rotation 222. The impeller 402 can be fixedly attached to the rotor 220, for example as shown in FIGS. 11 and 15. In some embodiments, the impeller 402 can be attached indirectly to the rotor 220, for example, by an intervening gear train. In some embodiments wherein the impeller 402 is attached to the rotor 220, the impeller 402 can surround the rotor 220. In some embodiments, the driver 214, the rotor 220, and the impeller 402 rotate about a common axis. In some embodiments, the impeller 402 can be disposed along the path 221 of filament travel such that the filament passes through a passage 430 in the impeller 402 as it moves from the aperture 422 toward the heater 302 (e.g., positioned surrounding the tube 306 of FIG. 14).

A passage 432 can extend through the rotor 220 of the motor 216, for example as illustrated in FIGS. 12-15. The passage 432 can be sized to receive the filament to pass therein. When the motor 216 includes a passage 432, motor 216 can be positioned along the path 221 of filament travel such that the filament passes through the passage 432 as it moves from the aperture 422 toward the heater 302.

The driver 214 can be disposed between (i) the motor 216 and (ii) components of the heater system, such as, for example, a heater 302, a heater mass 324, and/or a tube 306, as illustrated in FIGS. 11-15. Alternatively, the motor 216 can be positioned between (i) the driver 214 and (ii) components of the heater system, such as, for example, a heater 302, a heater mass 324, and/or a tube 306.

In some embodiments, the motor 216 and the driver 214 can be operatively coupled by a power transmission system 218 comprising a planetary gear train, for example as illustrated in FIGS. 11-15. The planetary gear train of FIGS.

11-15 has two stages, and comprises a first sun gear 434, a first set of planet gears 436, a first carrier 438, an annular gear 440, a second sun gear 442, a second set of planetary gears 444, and a second carrier 446. The first sun gear 434 is fixedly attached to the rotor 220 of the motor 216. As illustrated for example in FIG. 15, in a first stage, the first set of planet gears 436 and the first sun gear 434 are disposed within the annular gear 440, with the first set of planet gears 436 (i) arranged around the first sun gear 434 and (ii) engaging each of the first sun gear 434 and the annular gear 440. The first carrier 438 is coupled to and carries the first set of planet gears 436. The second sun gear 442 is fixedly attached to the first carrier 438. In a second stage, the second set of planet gears 444 and the second sun gear 442 are disposed within the annular gear 440, with the second set of planet gears 444 (i) arranged around the second sun gear 442 and (ii) engaging each of the second sun gear 442 and the annular gear 440, in a manner similar to that illustrated in FIG. 15 for the first stage. The second carrier 446 is coupled to and carries the second set of planet gears 444. The second carrier 446 also includes the receptacle 228 for receiving and holding the driver 214. Thus, the driver 214 is driven by the rotor 220 through the power transmission system 218 illustrated in FIGS. 11-15.

In some embodiments, a bearing 448 can couple the rotor 220 with the annular gear 440, for example as illustrated in FIGS. 12-15. The bearing 448 can comprise a low-friction bushing or a ball bearing, as illustrated for example in FIGS. 12-14. As illustrated for example in FIG. 14, the bearing 448 can be positioned in and engage the annular gear 440, and surround and engage a segment of the rotor 220. The bearing 448 can engage a segment of the rotor disposed between the first sun gear 434 and a stator of the motor 216.

Figure 14:
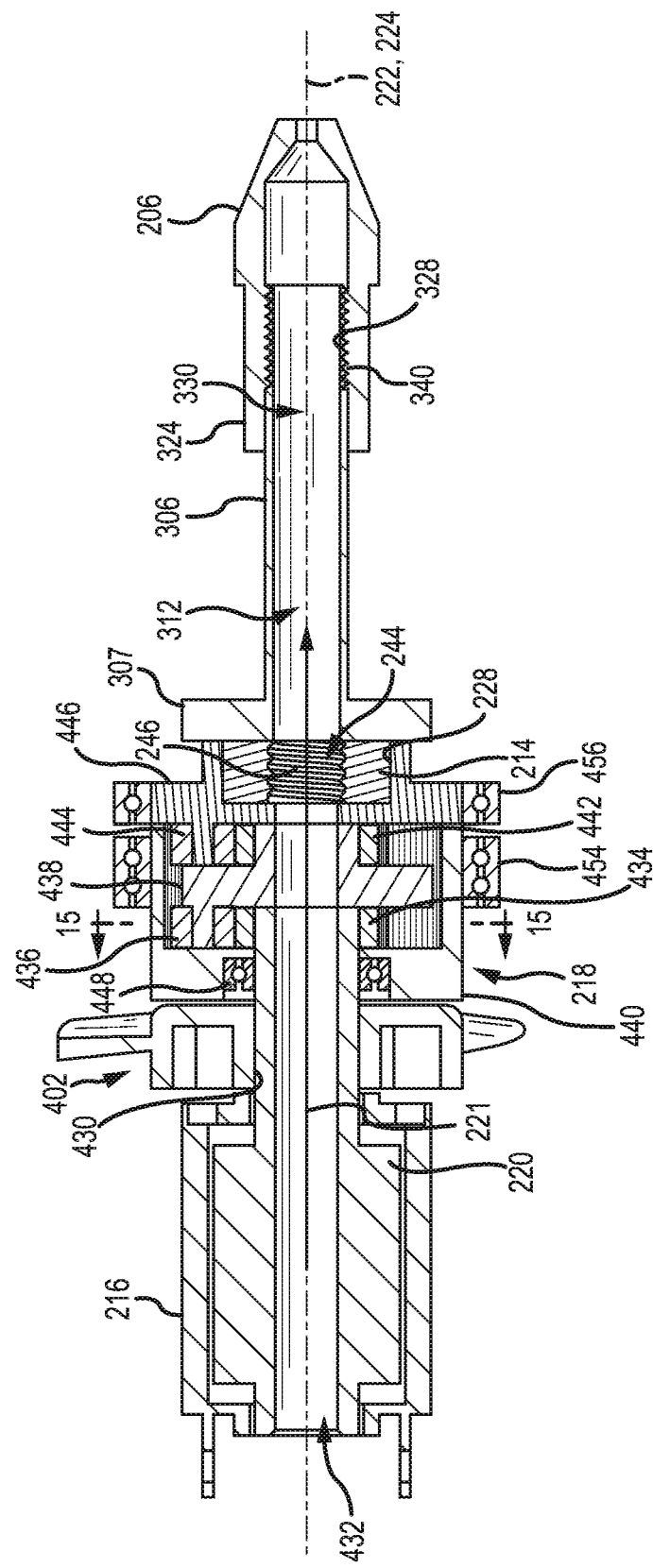
FIG. 14 is a cross-sectional view, taken along section line 14-14 in FIG. 15, of the assembly shown in FIG. 11, and additionally illustrating support bearings.
Figure 15:
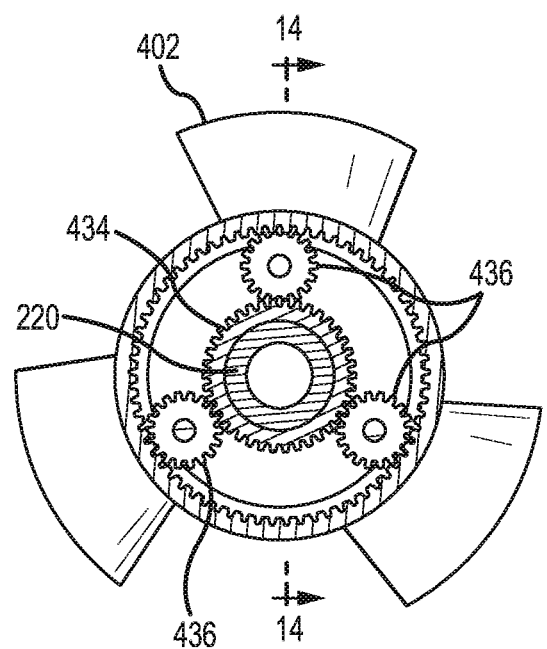
FIG. 15 is a cross-sectional view, taken along section line 15-15 in FIG. 14, of the assembly shown in FIG. 11.

In some embodiments, the annular gear 440 and the second carrier 446 each can be surrounded and engaged by one or more bearings 454, 456, for example as illustrated in FIG. 14. The bearings 454, 456 can be held by the housing 208, the frame 209, or both, and rotatably support the annular gear 440 and the second carrier 446. The bearings 454, 456 can comprise a low-friction bushing or a ball bearing, as illustrated for example in FIG. 14.

The first sun gear 434, the first carrier 438, the annular gear 440, the second sun gear 442, and the second carrier 446 each rotate about an axis, and their axes can be collinear, substantially collinear, coincident, or substantially coincident. The first sun gear 434, the first carrier 438, the annular gear 440, the second sun gear 442, and the second carrier 446 each have a passage configured to allow a filament pass through it along the path 221 of filament travel.

As discussed above, the tube 306 can be positioned so that the path 221 of filament travel through the extrusion device extends through the passage 312. The passage 312 of the tube 306 can be positioned close to the passage 244 of the driver 214 so that the filament enters the passage 312 as it exits, or shortly after exiting, the passage 244. The driver 214 and the tube 306 can be positioned relative to each other such that a central axis of the passage 312 and the axis 224 of the driver are collinear, substantially collinear, coincident, or substantially coincident.

As discussed above, the tube 306 can be attached to the heater mass 324, which can be attached to or integrally formed with the outlet 206. The heater mass 324 can be connected to the heat sink 304 by the tube 306, if present. The tube 306 can be disposed in the passage of the heat sink 304. In some embodiments, the flange 307 of the tube 306 can support the driver 214, the second carrier 446, or both, in addition or alternative to any support provided to one or both of them by the annular bearing 456.

Figure 16:
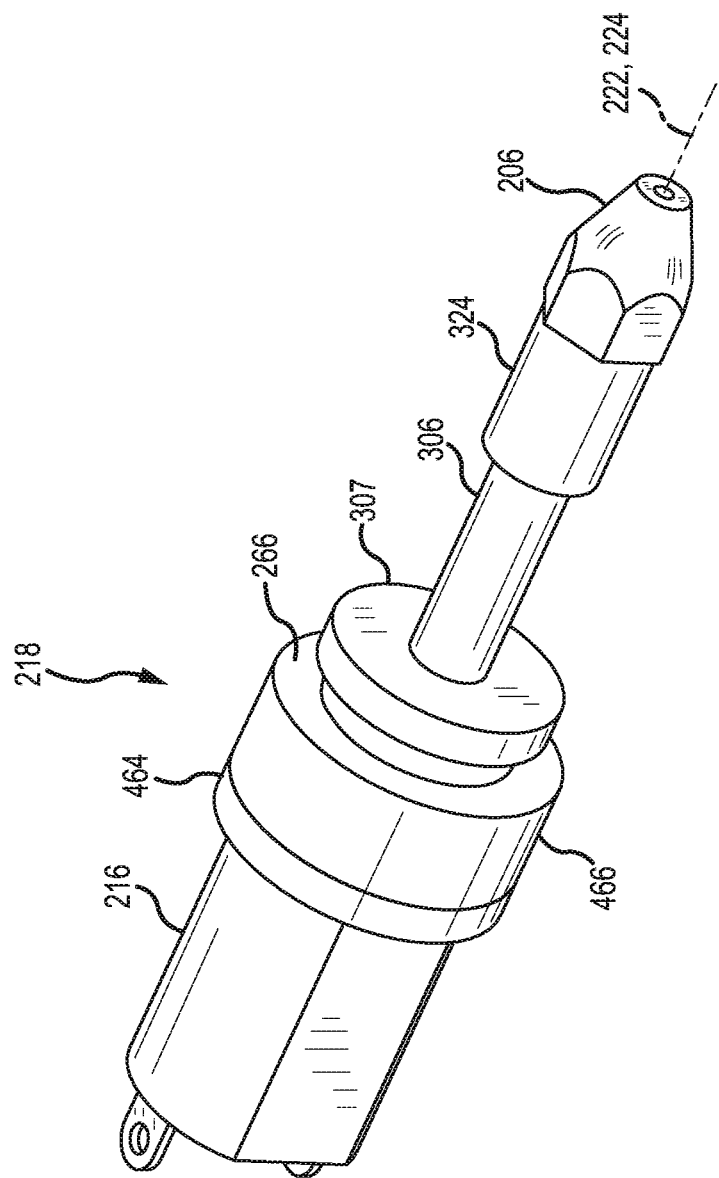
FIG. 16 is a front perspective view of an assembly of certain components of drive and heater systems of an extrusion device according to some aspects of the subject technology.
Figure 17:
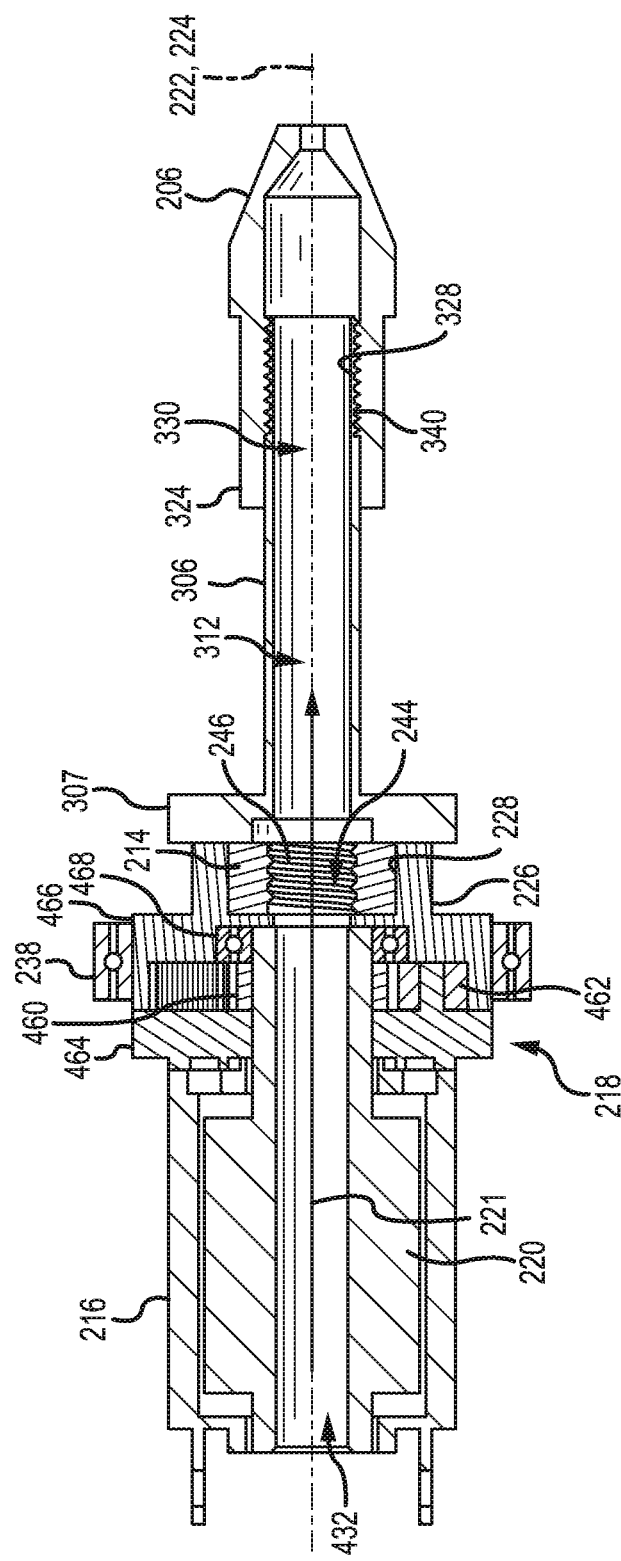
FIG. 17 is a cross-sectional view of the assembly shown in FIG. 11, and additionally illustrating a support bearing.

FIGS. 16 and 17 illustrate certain components, features, and aspects of the drive system 102 and heater system 104 of an extrusion device according to some aspects of the subject technology. Like FIGS. 11-15, FIGS. 16 and 17 illustrate the driver 214 and the motor 216 disposed relative to each other such that the axis of rotor rotation 222 and the access of driver rotation 224 are collinear and coincident. In some embodiments, these axes 222, 224 can be substantially collinear or substantially coincident. The power transmission system 218 illustrated in FIGS. 16 and 17 comprises a planetary gear train with a single stage. The planetary gear train of FIGS. 16 and 17 comprises sun gear 460, a set of planet gears 462, a planet gear carrier 464, and a driver carrier 226 comprising an annular gear 466. The sun gear 460 is fixedly attached to the rotor 220 of the motor 216. As illustrated for example in FIG. 17, the set of planet gears 462 and the sun gear 460 are disposed within the annular gear 466, with the set of planet gears 462 (i) arranged around the sun gear 460 and (ii) engaging each of the sun gear 460 and the annular gear 466. The carrier 464 is coupled to and carries the set of planet gears 462. The carrier 226 comprises the annular gear 466 and the receptacle 228 for receiving and holding the driver 214. Thus, the driver 214 is driven by the rotor 220 through the power transmission system 218 illustrated in FIGS. 16 and 17.

In some embodiments, a bearing 468 can couple the rotor 220 with the carrier 226 (and the annular gear 440), for example as illustrated in FIG. 17. The bearing 468 can comprise a low-friction bushing or a ball bearing, as illustrated for example in FIG. 17. As illustrated for example in FIG. 17, the bearing 468 can be positioned in and engage the carrier 226, and surround and engage a segment of the rotor 220. The bearing 468 can engage a segment of the rotor disposed farther from a stator of the motor 216 than is between the sun gear 460. The carrier 226 can be surrounded and engaged by a bearing 238, as discussed above, for example as illustrated in FIG. 17. The bearing 238 can be held by the housing 208, the frame 209, or both, and rotatably support the carrier 226 (and the annular gear 440).

With continued reference to FIGS. 16 and 17, the tube 306 can be positioned so that the path 221 of filament travel through the extrusion device extends through the passage 312, as discussed above. As also discussed above, the tube 306 can be attached to the heater mass 324, the outlet 206, the heat sink 304, the heater 302, and other components of the extrusion device.

Figure 18:
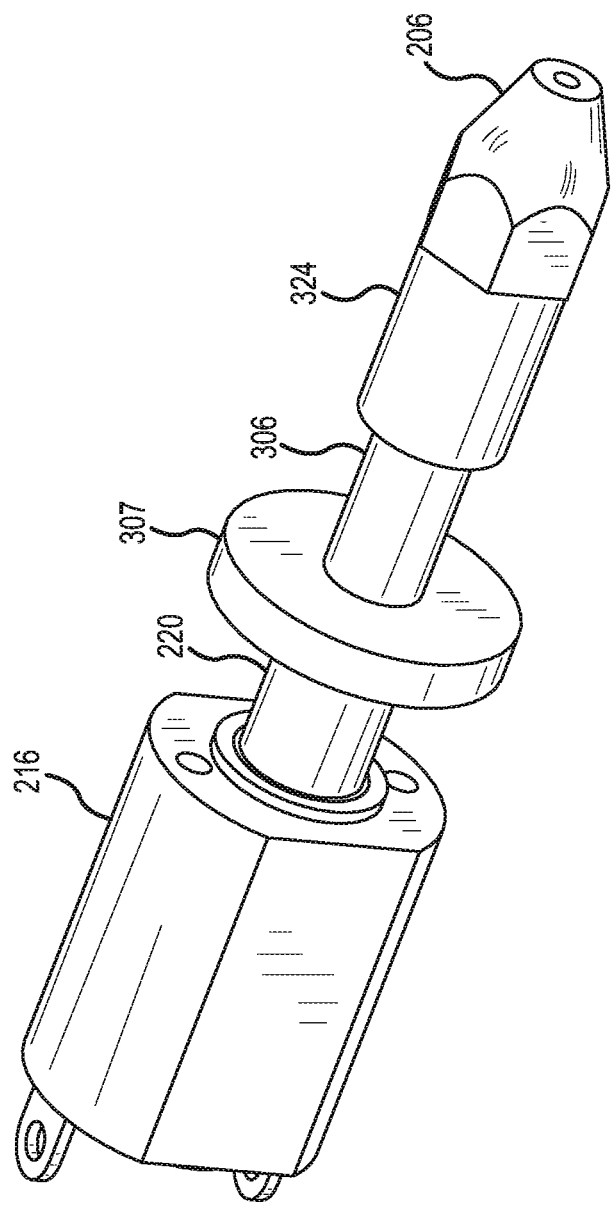
FIG. 18 is a front perspective view of an assembly of certain components of drive and heater systems of an extrusion device according to some aspects of the subject technology.
Figure 19:
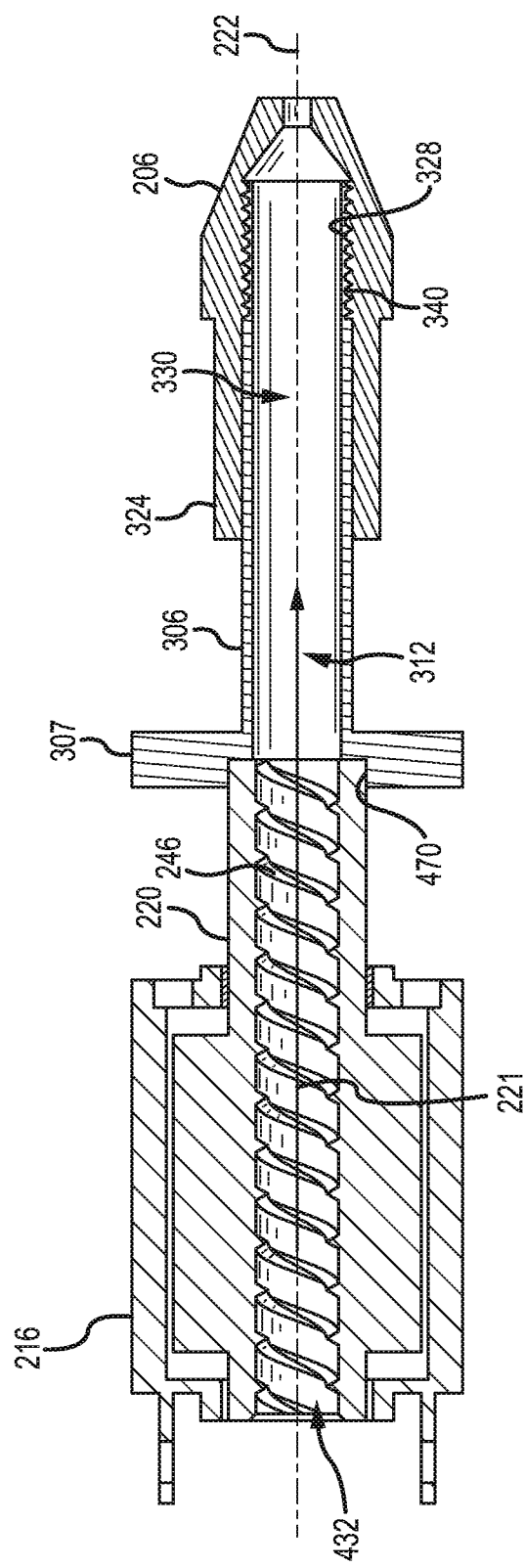
FIG. 19 is a cross-sectional section view of the assembly shown in FIG. 18.

FIGS. 18 and 19 illustrate certain components, features, and aspects of the drive system 102 and heater system 104 of an extrusion device according to some aspects of the subject technology. FIGS. 18 and 19 illustrate a motor 216 having a rotor 220 configured to drive a filament. Thus, the rotor 220 of FIGS. 18 and 19 is not coupled to a power transmission system, such as a gear train. As illustrated for example in FIGS. 18 and 19, the passage 432 of the rotor 220 can comprise the one or more filament-engaging members 246, e.g., threads, in an interior of the passage 432, as disclosed herein with reference to the passage 244, in some embodiments. As the filament-engaging members 246 have been described above, a complete description of them is not repeated here. Nonetheless, it is noted that the description of the filament-engaging members 246 provided with reference to the passage 244 of the driver 214 applies also to the filament-engaging members 246 in the passage 432 of the rotor 220. An axis of a helix of the filament-engaging members can be parallel, substantially parallel, collinear, substantially collinear, coincident, or substantially coincident with an axis of rotation 222 of the rotor 220.

With continued reference to FIGS. 18 and 19, the tube 306 can be positioned so that the path 221 of filament travel through the extrusion device extends through the passage 312, as discussed above. As also discussed above, the tube 306 can be attached to the heater mass 324, the outlet 206, the heat sink 304, the heater 302, and other components of the extrusion device.

In some embodiments, and end of the rotor 220 can extend into a recess 470 in the tube 306 and be supported therein, for example as illustrated FIG. 19. In some embodiments, a bearing can couple the end of the rotor 220 with the tube 306 at the recess 470. The bearing can comprise a low-friction bushing or a ball bearing. The bearing can be positioned in and engage the tube 306, and surround and engage a segment of the rotor 220.

Figure 20:
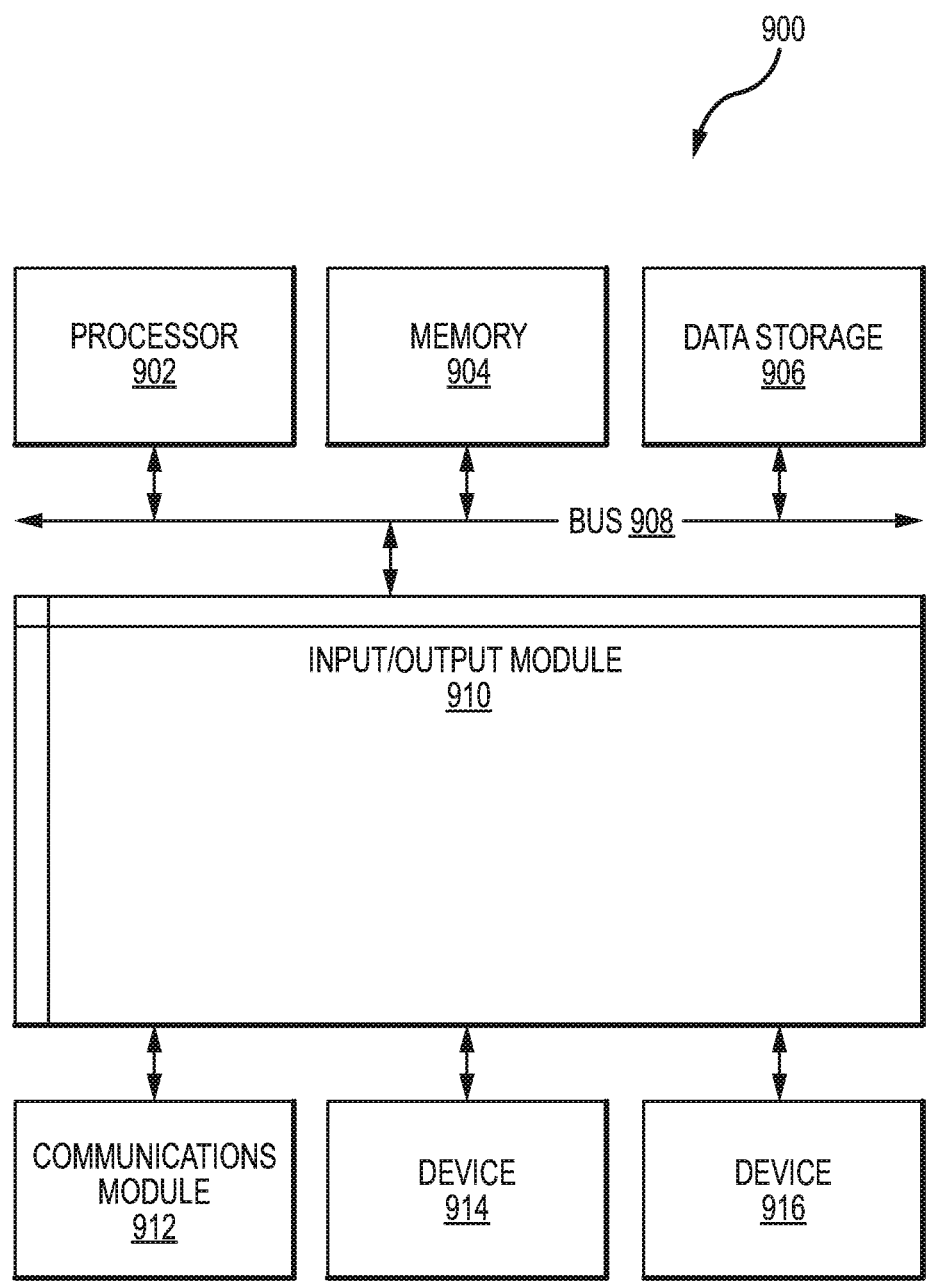
FIG. 20 is an exemplary diagram of a computer system implementing methods of the subject technology.

FIG. 20 is a block diagram illustrating an exemplary control system 900 with which the control system 102 can be implemented. In certain aspects, the computer system 900 can be implemented using hardware or a combination of software and hardware, and can be distributed across multiple entities.

The computer system 900 includes a bus 908 or other communication mechanism for communicating information, and a processor 902 coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 900 can include, in addition to hardware, code that creates an execution environment for the computer program implementing the control processes disclosed herein, e.g., code that constitutes processor firmware, a protocol stack, a database management system, an operating system, or a combination of one or more of them stored in an included memory 904, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, i.e., one or more control systems 106 of computer program instructions encoded on a computer readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices (e.g., input mechanisms). The input/output module 910 can be any module having an input/output. Exemplary input/output modules 910 include data ports such as USB ports. The input/output module 910 is configured to connect to a communications module 912. Exemplary communications modules 912 include networking interface cards, such as Ethernet cards and modems. In certain aspects, the input/output module 910 is configured to connect to a plurality of devices, such as an input device 914 (e.g., buttons 450) and/or an output device 916 (e.g., motor 216). Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 916 include display devices, such as a CRT (cathode ray tube) or LCD (liquid crystal display) monitor, for displaying information to the user.

According to one aspect of the present disclosure, operation of control system 142 can be implemented using a computer system 900 with a processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

The term "machine-readable storage medium" or "computer readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires that comprise bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While certain aspects and embodiments of the subject technology have been described, these have been presented by way of example only, and are not intended to limit the scope of the subject technology. Indeed, the novel methods and systems described herein may be embodied in a variety of other forms without departing from the spirit thereof. The accompanying claims and their equivalents are intended to cover such forms or modifications as would fall within the scope and spirit of the subject technology.

What is claimed is:

1. An extrusion device comprising:
   a housing configured to fit in a user's hand and shaped to allow manipulation of the housing like a pen, the housing having an outlet and an aperture for introduction of a filament into the housing;
   a motor disposed within the housing, the motor comprising a rotor and a motor passage extending through the motor along a central axis of the motor to permit movement of the filament through the motor along the axis;
   a driver operatively coupled with the motor via a gear train such that the driver is rotated about the axis of the motor by operation of the motor, the driver having a driver passage extending through the driver along the axis of the motor, the axis of the motor extending through the driver passage and the motor passage, the driver comprising a filament-engaging member positioned in the driver passage and configured to engage the filament extending through the driver passage such that rotation of the driver moves the filament along the axis relative to the driver, the driver positioned such that a first direction of rotation of the driver urges the filament along the axis toward the outlet; and a heater configured to melt the filament and disposed between the driver and the outlet to receive the filament from the driver.

2. The extrusion device of claim 1, wherein the filament-engaging member engages the filament along a helical path around the filament.

3. The extrusion device of claim 2, wherein the filament-engaging member comprises a thread.

4. The extrusion device of claim 3, wherein the thread is self-tapping or self-starting.

5. The extrusion device of claim 2, further comprising a second filament-engaging member.

6. The extrusion device of claim 5, wherein the filament-engaging members are spaced equidistant about circumference of the driver passage.

7. The extrusion device of claim 1, wherein the passage of the rotor is sized to receive the filament and disposed on a common filament path with the driver passage.

8. The extrusion device of claim 1, further comprising a fan positioned surrounding and attached to the rotor.

9. The extrusion device of claim 1, wherein the rotor comprises the driver.

10. The extrusion device of claim 1, further comprising a bearing surrounding and engaging an end segment of the rotor.

11. The extrusion device of claim 10, further comprising a planetary gear train having a sun gear, planet gears, and an annular gear, and wherein the bearing is positioned in and engages the annular gear, and sun gear is fixedly attached to the rotor.

12. The extrusion device of claim 1, further comprising a carrier holding the driver, the carrier comprising a driven gear exterior to the driver passage.

13. The extrusion device of claim 1, wherein the driver comprises an annulus surrounding the driver passage, the annulus comprising a plurality of components, the plurality of components comprising a first portion and a second portion separate from the first portion, the first portion and the second portion opposing each other across the driver passage.

14. The extrusion device of claim 13, wherein the first portion and the second portion are elastically urged together.

15. The extrusion device of claim 14, wherein the driver further comprises fasteners coupling the first portion and the second portion, and the first portion and the second portion are elastically are urged together by springs.

16. The extrusion device of claim 1, wherein the motor passage does not comprise a filament-engaging member.

17. A method for extruding material using the extrusion device of claim 1, the method comprising:
introducing the filament into the driver passage;
advancing the filament into the heater by rotating the driver;
melting material of the filament; and
extruding the melted material through the outlet.

18. The method of claim 17, further comprising advancing the filament through the motor passage.

19. The method of claim 17, further comprising advancing a filament through a fan.

20. The method of claim 19, further comprising spinning the fan with the rotor of the motor.

* * * * *